United States Patent
Itoh

(10) Patent No.: US 8,229,927 B2
(45) Date of Patent: Jul. 24, 2012

(54) APPARATUS, SYSTEM, AND METHOD FOR INFORMATION SEARCH

(75) Inventor: Hideo Itoh, Machida (JP)

(73) Assignee: Ricoh Company, Limited, Tokyo (JP)

( * ) Notice: Subject to any disclaimer, the term of this patent is extended or adjusted under 35 U.S.C. 154(b) by 317 days.

(21) Appl. No.: 12/351,451

(22) Filed: Jan. 9, 2009

(65) Prior Publication Data

US 2009/0182733 A1 Jul. 16, 2009

(30) Foreign Application Priority Data

Jan. 11, 2008 (JP) ................. 2008-004864

(51) Int. Cl.
*G06F 7/00* (2006.01)
*G06F 17/30* (2006.01)
*G06F 17/20* (2006.01)

(52) U.S. Cl. ........ 707/730; 707/722; 707/726; 707/727; 707/758; 707/767; 715/212; 715/215

(58) Field of Classification Search .................. 707/748, 707/758, 999.003, 999.005, 713, 741, 706, 707/722, 769, 726–730, 767; 715/227, 205, 715/206, 700, 230, 255, 212, 215, 217, 219
See application file for complete search history.

(56) References Cited

U.S. PATENT DOCUMENTS

| | | | |
|---|---|---|---|
| 6,546,388 B1 * | 4/2003 | Edlund et al. ..................... | 1/1 |
| 6,629,097 B1 * | 9/2003 | Keith ................................. | 1/1 |
| 7,333,976 B1 * | 2/2008 | Auerbach et al. ................. | 1/1 |
| 8,006,197 B1 * | 8/2011 | Nevill-Manning et al. ... | 715/788 |
| 2003/0217047 A1 * | 11/2003 | Marchisio ......................... | 707/3 |
| 2004/0111404 A1 | 6/2004 | Mano et al. | |
| 2004/0249809 A1 * | 12/2004 | Ramani et al. .................... | 707/4 |
| 2005/0065919 A1 | 3/2005 | Gotoh et al. | |
| 2005/0149504 A1 * | 7/2005 | Ratnaparkhi ..................... | 707/3 |
| 2005/0257158 A1 * | 11/2005 | Lombardo ...................... | 715/751 |
| 2006/0061796 A1 * | 3/2006 | O'Sullivan ................... | 358/1.14 |
| 2006/0174209 A1 * | 8/2006 | Barros ........................ | 715/764 |
| 2008/0222144 A1 * | 9/2008 | Backer et al. .................... | 707/5 |
| 2008/0288483 A1 * | 11/2008 | Lin et al. ......................... | 707/5 |
| 2009/0064029 A1 * | 3/2009 | Corkran et al. ............... | 715/781 |

FOREIGN PATENT DOCUMENTS

| | | |
|---|---|---|
| JP | 2005-92825 | 4/2005 |
| JP | 2007-233752 | 9/2007 |

* cited by examiner

*Primary Examiner* — Mohammad Ali
*Assistant Examiner* — Bao Tran
(74) *Attorney, Agent, or Firm* — Oblon, Spivak, McClelland, Maier & Neustadt, L.L.P.

(57) ABSTRACT

A search option input by a user is obtained through a user interface and a search term is determined based on the search option. A document database is searched to obtain a document that matches the search term and a search result is generated, including document information identifying the document that matches the search term and relevancy information indicating a degree of relevancy between the search term and the document. A display device displays the search result in a format indicating the correspondence relationship of the document information, the search term, and the relevancy information.

17 Claims, 25 Drawing Sheets

FIG. 5A

SEARCH OPTION SELECTION — 300

| DOCUMENT | ⦿ US PATENT | ○ FOREIGN PATENT | ○ DESIGN PATENT | — 301 |
| QUERY TYPE | ⦿ SENTENCE | ○ KEYWORD | ○ BIBLIOGRAPHIC DATA | — 302 |

303

| SENTENCE 1 | A\*\*B\*\*\*\*C\*, A\*\*D\*\*, B\*E\*\*\*, C\*F\*. |

SEARCH OPTION SELECTION — 300

| DOCUMENT | ⦿ US PATENT | ○ FOREIGN PATENT | ○ DESIGN PATENT | — 301 |
| QUERY TYPE | ○ SENTENCE | ⦿ KEYWORD | ○ BIBLIOGRAPHIC DATA | — 302 |

303

KEYWORD  A and

B and

| ID | HIT | SEARCH TERM | DOCUMENT NO. |
|---|---|---|---|
| 001 | 328 | A | **-***a |
| 002 | 40 | A | **-***b |
| 003 | 12 | A | **-***e |
| ⋮ | ⋮ | ⋮ | ⋮ |
| 011 | 155 | $A_1$ | **-***a |
| 012 | 96 | $A_1$ | **-***c |
| 013 | 106 | $A_1$ | **-***f |
| ⋮ | ⋮ | ⋮ | ⋮ |
| 021 | 78 | B | **-***a |
| 022 | 3 | B | **-***c |
| 023 | 90 | B | **-***d |
| ⋮ | ⋮ | ⋮ | ⋮ |
| 101 | 14 | $C_1$ | **-***a |
| 102 | 2 | $C_1$ | **-***d |
| ⋮ | ⋮ | ⋮ | ⋮ |

| DOCUMENT NO. | A | $A_1$ | B | $B_1$ | $B_2$ | C | $C_1$ | |
|---|---|---|---|---|---|---|---|---|
| **-***a | 328 | 155 | 78 | 105 | 49 | 433 | 14 | |
| **-***b | 40 | | | 4 | | 78 | | |
| **-***c | | 96 | 3 | 20 | | 168 | | |
| **-***d | | | 1 | 90 | | 1 | 2 | ... |
| **-***e | 12 | | 3 | | | 40 | | |
| **-***f | | 106 | | 17 | | 463 | | |
| ⋮ | | | | | | | | |

FIG. 12

| DOCUMENT NO. | TITLE | RELEVANCY VALUE |
|---|---|---|
| **-***a | * * * * * * | 77% |
| **-***b | * * * * * * | 70% |
| **-***c | * * * * * * | 66% |
| **-***d | * * * * * * | 62% |
| **-***e | * * * * * * | 61% |
| **-***f | * * * * * * | 59% |
| **-***g | * * * * * * | 59% |
| **-***h | * * * * * * | 56% |
| **-***i | * * * * * * | 55% |

SEARCH RESULT DISPLAY SCREEN (RELEVANCY VALUE)

SCORE ▽

| PUBLICATION NO. | : **-*** |
|---|---|
| APPLICATION S/N | : **-*** |
| IPC | : G06F17/30  G06F17/21  G06F15/20 |
| USC | : * * * * * * |
| FIELD OF SEARCH | : * * * * * * |
| PUBLICATION DATE | : * * / * * / * * |
| FILING DATE | : * * / * * / * * |
| ASSIGNEE NAME | : * * * * * * |
| ATTORNEY NAME | : * * * * * * |
| INVENTOR NAME | : * * * * * * |

SEARCH RESULT SCREEN (IPC) — 500

BIBLIOGRAPHIC DATA ▷ — 501    IPC ▷ — 503

| IPC | NO. OF DOCUMENTS | KEY TERMS |
|---|---|---|
| G06F17/30 | 821 | ** **** ***** ***** ***** * |
| G06F14/40 | 59 | ** **** ***** **** ** |
| G06F17/21 | 39 | ** **** ***** ** |
| G06F12/00 | 17 | ** **** *** * |
| G06F15/20 | 10 | ** **** *** ** |
| G06F7/28 | 6 | ** **** **** ** |
| G06T1/00 | 6 | ** *** **** * |
| G06F17/22 | 4 | ** **** **** ** |
| G06F17/27 | 4 | ** **** **** ** |
| G06F15/403 | 3 | ** **** **** ** |
| G06F15/62 | 3 | ** **** **** ** |
| G06F17/28 | 3 | ** **** **** ** |
| G06F3/00 | 3 | ** **** **** ** |
| ... | | |

SEARCH RESULT SCREEN (IPC) — 500

▷ BIBLIOGRAPHIC DATA    ▷ IPC × 2 — 503

501

| IPC | NO. OF DOCUMENTS | KEY TERMS |
|---|---|---|
| G06F17/30 * G06F15/40 | 55 | **** **** **** **** **** |
| G06F17/30 * G06F17/21 | 34 | *** **** **** **** **** |
| G06F17/30 * G06F12/00 | 16 | **** **** **** **** |
| G06F17/30 * G06F15/20 | 8 | ** ** ***** |
| ⋮ | | |

SEARCH RESULT SCREEN (IPC) — 500

▷ BIBLIOGRAPHIC DATA    ▷ IPC × 3 — 503

501

| IPC | NO. OF DOCUMENTS | KEY TERMS |
|---|---|---|
| G06F17/30 * G06F15/40 * G06T1/00 | 5 | **** **** **** **** **** |
| G06F17/30 * G06F17/21 * G06F15/20 | 4 | **** **** **** **** **** |
| G06F17/30 * G06F12/00 * G06F7/28 | 3 | **** **** **** **** **** |
| G06F17/30 * G06F15/22 * G06F15/62 | 2 | *** **** **** **** |
| ⋮ | | |

SEARCH RESULT SCREEN (IPC) — 500

BIBLIOGRAPHIC DATA ▽ — 501    IPC ▽    IPC ▽ — 503

| IPC | NO. OF DOCUMENTS | KEY TERMS |
|---|---|---|
| G06F3/00 | ▫ 3 | ************************ |
| G06F7/28 | ▫ 6 | ************************ |
| G06F12/00 | ▨ 17 | ************************ |
| G06F14/40 | ▨ 59 | ******************* |
| G06F15/20 | ▨ 10 | ************************ |
| G06F15/403 | ▫ 3 | ************************ |
| G06F15/62 | ▫ 3 | ************************ |
| G06F17/21 | ▨ 39 | ************************ |
| G06F17/22 | ▫ 4 | ************************ |
| G06F17/27 | ▫ 4 | ************************ |
| G06F17/28 | ▫ 3 | ************************ |
| G06F17/30 | ▨ 821 | ************************ |
| G06T1/00 | ▫ 6 | ************************ |
| ... | | |

— 502

APPARATUS, SYSTEM, AND METHOD FOR INFORMATION SEARCH

CROSS-REFERENCE TO RELATED APPLICATIONS

This patent application is based on and claims priority under 35 U.S.C. §119 to Japanese Patent Application No. 2008-004864, filed on Jan. 11, 2008 in the Japanese Patent Office, the disclosure of which is hereby incorporated herein by reference.

FIELD OF THE INVENTION

The present invention generally relates to an apparatus, system, and method for information search, and more specifically to an apparatus, system, and method for searching a document using a search term.

BACKGROUND

In order to search a document from a document database, a user inputs a search option such as a search term to be used for searching. Selecting a useful search term that would lead to a document that satisfies the user's need has been difficult as the search term that is too general may return a large number of documents and the search term that is too specific may return a small number of documents.

Especially when a plurality of search terms are used for searching, it has been difficult to select a combination of search terms that would lead to a sufficient number of documents satisfying the user's need as a large number of combinations of search terms are available.

Further, when a large number of documents are obtained as a search result, it has been difficult to analyze the search result to select a small number of documents satisfying the user's need.

SUMMARY

Example embodiments of the present invention include an apparatus, system, and method of searching. When a search option input by a user is obtained, a search term is determined based on the search option. A document database is searched to obtain a document that matches the search term. A search result is generated, which includes information identifying the document that matches the search term and relevancy information indicating the degree of relevancy between the search term and the document. The search result is displayed in a format indicating the correspondence relationship of the document information, the search term, and the relevancy information.

Example embodiments of the present invention include an apparatus, system, and method of assisting information search. When a search option input by a user is obtained, an extracted search term and a related search term corresponding to the extracted search term are determined based on the search option. The correspondence relationship information indicating the correspondence relationship between the extracted search term and the related search term is generated. The extracted search term and the related search term are displayed in a format indicating the correspondence relationship between the extracted search term and the related search term using the correspondence relationship information.

Example embodiments of the present invention include an apparatus, system, and method of analyzing a search result. When a user instruction for analyzing a search result including information regarding a plurality of documents previously obtained in response to a search request sent by a user is obtained, and the user instruction for analyzing includes information specifying a type of attribute data to be used for analyzing the search result, the plurality of documents included in the search result are classified based on the specified attribute data type into one or more groups of the plurality of documents. The arrangement of the one or more groups of the plurality of documents is determined according to the specified attribute data type. An analysis result is displayed, which includes information regarding the one or more groups of the plurality of documents in the determined arrangement.

In addition to the above-described example embodiments, the present invention may be practiced in various other ways, for example, as a recording medium storing a plurality of instructions that causes a processor to perform the above-described information search method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A is an illustration for explaining a search option selection screen, displayed by the client apparatus of FIG. 1, according to an example embodiment of the present invention;

FIG. 5B is an illustration for explaining a search option selection screen, displayed by the client apparatus of FIG. 1, according to an example embodiment of the present invention;

FIG. 9 is an illustration for explaining a search list obtained and stored by the information search apparatus of FIG. 1, according to an example embodiment of the present invention;

FIG. 12 is an illustration for explaining a search result screen, displayed by the client apparatus of FIG. 1, according to an example embodiment of the present invention;

FIG. 23 is an illustration for explaining a search result screen, displayed by the client apparatus of FIG. 1, according to an example embodiment of the present invention;

FIG. 26 is an illustration for explaining a search result screen, displayed by the client apparatus of FIG. 1, according to an example embodiment of the present invention;

FIG. 27 is an illustration for explaining a search result screen, displayed by the client apparatus of FIG. 1, according to an example embodiment of the present invention;

FIG. 30 is an illustration for explaining a search result screen, displayed by the client apparatus of FIG. 1, according to an example embodiment of the present invention;

Figure 1:
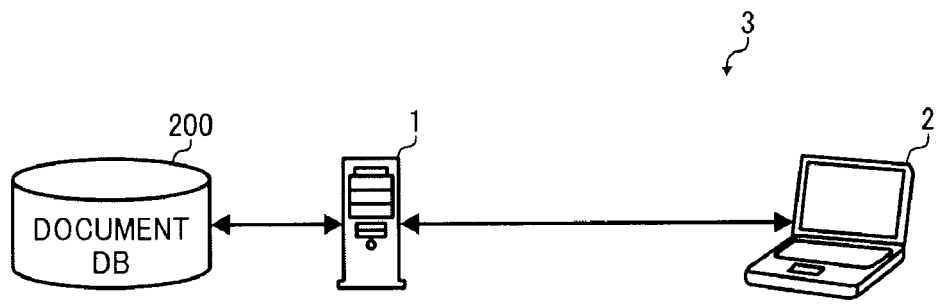
FIG. 1 is a schematic diagram illustrating a configuration of an information search system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, an information search system 3 is explained according to an example embodiment of the present invention. For the illustrative purpose, in the following examples, the information search system 3 searches one or more documents in response to a search request sent by a user. As illustrated in FIG. 1, the information search system 3 includes an information search apparatus 1, a client apparatus 2, and a document database 200, which are connected through a network.

The client apparatus 2 may be implemented by any desired information processing apparatus such as a personal computer, portable computer, personal digital assistance (PDA) device, portable phone, digital camera, etc. As described below referring to FIG. 2, in this example, the client apparatus 2 is implemented by an information processing apparatus.

The information search apparatus 1 searches the document database 200 to obtain a document in response to a search request sent by the client apparatus 2 or input through the information search apparatus 1. As described below referring to FIG. 2, the information search apparatus 1 may be implemented by any desired information processing apparatus such as a personal computer. Alternatively, the information search apparatus 1 may be implemented by a multifunctional apparatus capable of performing a plurality of functions including the functions of copying, printing, faxing, and communicating via a network. Alternatively, any number of devices or apparatus may perform one or more operations or functions performed by the information search apparatus 1.

The document database 200 stores a plurality of documents in the electronic format. For example, the document database 200 may be implemented by any number of servers each storing a collection of documents subjected for searching. Alternatively, the document database 200 may be partially or entirely provided in the information search apparatus 1. Alternatively, the document database 200 may store information regarding a plurality of documents available for search as attribute information. In another example, the document database 200 may store information regarding a plurality of documents available on the network, such as metadata information indicating characteristics of each document. In another example, the document database 200 may store information regarding a plurality of documents available for use in the library, such as bibliographic information indicating characteristics of each document. In another example, the document database 200 may store information regarding a plurality of patent related documents, such as bibliographic information indicating characteristics of each patent related document.

The network may include, for example, a local area network (LAN), the Internet, wired network, wireless network, etc.

Figure 2:
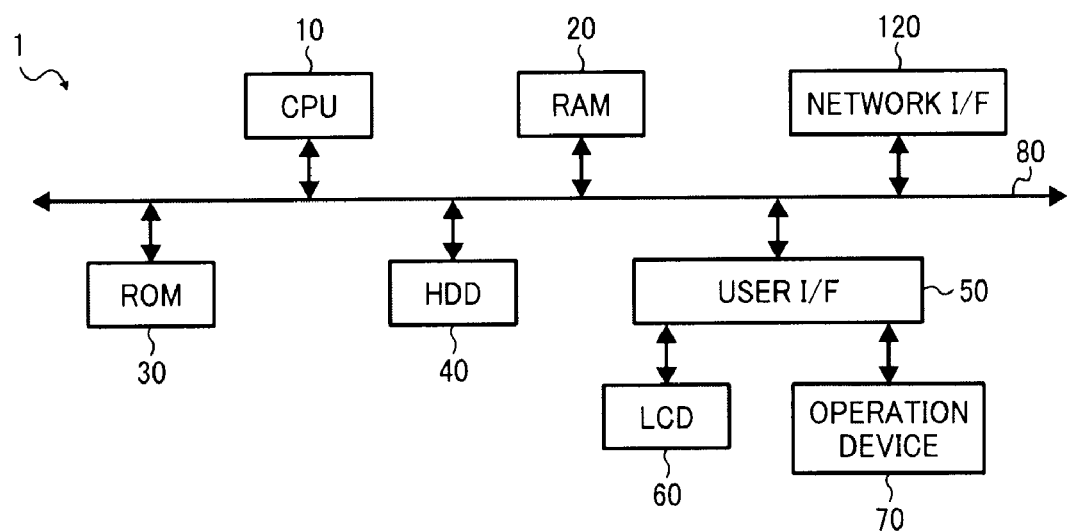
FIG. 2 is a schematic block diagram illustrating a hardware structure of an information search apparatus shown in FIG. 1, according to an example embodiment of the present invention.

Referring now to FIG. 2, a hardware structure of the information search apparatus 1 is explained according to an example embodiment of the present invention. The information search apparatus 1 includes a central processing unit (CPU) 10, a random access memory (RAM) 20, a read only memory (ROM) 30, a hard disk drive (HDD) 40, a user interface (I/F) 50, and a network interface (I/F) 120, which are connected via a bus 80. The information search apparatus 1 may be additionally provided with a liquid crystal display (LCD) 60 or an operation device 70, which is connected to the user I/F 50.

The CPU 10, which may be implemented by any desired processor such as a microprocessor, controls operation of the information search apparatus 1. The RAM 20, which may be implemented by a volatile memory, may function as a work area of the CPU 10. The ROM 30, which may be implemented by an involatile memory, may store various data such as firmware program. The HDD 40, which may be implemented by an involatile memory, may store various data such as an Operating System (OS), a control program, and an application program. The network I/F 120 allows the information search apparatus 1 to communicate with the outside apparatus through the network. The network I/F 120 may be implemented by, for example, the interface in compliance with Ethernet or USB. The user I/F 50 allows the user to interact with the information search apparatus 1 through the LCD 60 or the operation device 70. The LCD 60 displays various information to the user such as information regarding the status of the information search apparatus 1. The operation device 70, which may be implemented by a mouse or a keyboard, receives a user instruction from the user. In this example, the information search apparatus 1 functions as a server apparatus, which performs operation requested by the client apparatus 2. In such case, the user I/F 50, the LCD 60 or the operation device 70 may not be provided. Alternatively, the LCD 60 and the operation device 70 may be incorporated into one device such as a display device functioning as a touch panel.

In this example, an information search program may be stored in any desired memory such as the ROM 30, HDD 40, a storage device provided on the network, a recording medium, or any storage device that can be accessed by the information search apparatus 1. For example, when the information search apparatus 1 is activated, the information search program may be loaded onto the RAM 20, which causes the CPU 10 to perform operation according to the loaded information search program.

The client apparatus 2 of FIG. 1 may have a hardware structure substantially similar to the hardware structure of FIG. 2. In one example, a browser program such as a web browser program may be stored in any desired memory such as the ROM 30, HDD 40, a storage device provided on the network, a recording medium, or any storage device that can be accessed by the client apparatus 2. In such case, the browser program causes the client apparatus 2 to input a user instruction such as a search request to be sent to the information search apparatus 1 or to display information such as a search result received from the information search apparatus 1.

In another example, the information search program may be partially or entirely stored in any desired memory such as the ROM 30, HDD 40, or any storage device that can be accessed by the client apparatus 2. In such case, the information search apparatus 1 and the client apparatus 2 may together perform operation of searching to generate a search result or operation of analyzing the search result. For example, the client apparatus 2 may be provided with a software component that causes the client apparatus 2 to perform operation of analyzing the search result received from the information search apparatus 1.

Figure 3:
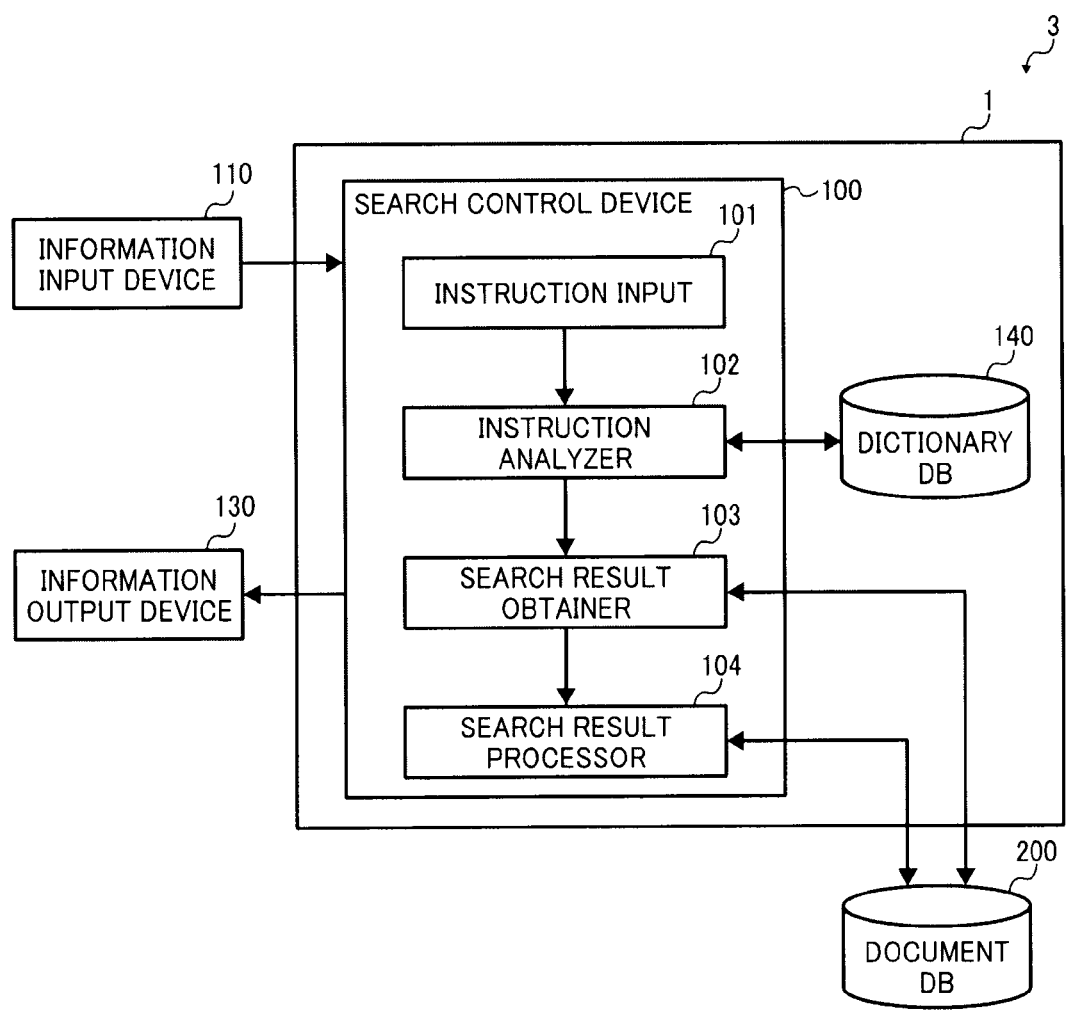
FIG. 3 is a schematic block diagram illustrating a functional structure of the information search system shown in FIG. 1 including the information search apparatus shown in FIG. 1, according to an example embodiment of the present invention.

Referring now to FIG. 3, a functional structure of the information search system 3 including the information search apparatus 1 is explained according to an example embodiment of the present invention. More specifically, upon loading the information search program, the information search apparatus 1 may be caused to function as a search control device 100. In addition to the search control device 100, the information search system 3 includes an information input device 110, an information output device 130, a dictionary database (DB) 140, and the document DB 200.

The information input device 110 allows the user to input a user instruction to the information search apparatus 1. Such function of the information input device 110 may be performed through the user I/F 50 or the operation device 70 (FIG. 2), which may be provided in the information search apparatus 1 or the client apparatus 2. Additionally, the information input device 110 may include the network I/F 120, for example, which allows the user instruction input by the user to be sent to the information search apparatus 1 when the information input device 110 is provided remote from the information search apparatus 1.

The information output device 130 displays information such as the status of the information search apparatus 1 or a search result obtained by the information search apparatus 1. For example, such function of the information output device 130 may be performed through the user I/F 50 or the LCD 60 (FIG. 2), which may be provided in the information search apparatus 1 or the client apparatus 2. Alternatively, the information output device 130 may be implemented by any desired printer, for example, when the information search apparatus 1 or the information search system 3 is provided with a printer.

The dictionary DB 140 stores a plurality of terms, which may be used for searching. The dictionary DB 140 may be stored in any desired memory or storage device in the information search apparatus 1 such as the HDD 40 or the RAM 20. Alternatively or additionally, the dictionary DB 140 may be stored in any desired memory or storage device available on the network, such as a server apparatus provided outside the information search apparatus 1. Alternatively or additionally, the dictionary DB 140 may be stored in any desired memory or storage device in the client apparatus 2. The dictionary DB 140 may be generated, for example, by registering a term and one or more terms that are related to the registered term.

The search control device 100 controls operation of searching a document, performed by the information search apparatus 1 according to the information search program. The search control device 100 may include an instruction input 101, an instruction analyzer 102, a search result obtainer 103, and a search result processor 104.

The instruction input 101 obtains a user instruction from a user through the information input device 110. In this example, the user instruction may include a search request that requests the information search apparatus 1 to perform search using a search option input by the user. The instruction analyzer 102 analyzes the user instruction received by the instruction input 101, and determines one or more search parameters to be used for searching, for example, based on the analysis of the search option input by the user. For example, based on the search option obtainable from the user instruction, the instruction analyzer 102 may determine a search term to be used for searching a document.

Further, the instruction analyzer 102 may generate identification information that uniquely identifies each search term or correspondence relationship information that shows the correspondence relationship among the search terms. For example, the instruction analyzer 102 may cause the information output device 130 to display information regarding the search term to be used for searching, which may be determined by the instruction analyzer 102 based on the search option input by the user, in a format indicating the correspondence relationship among a plurality of search terms using the identification information or the correspondence relationship information.

The search result obtainer 103 searches through the document database 200 to obtain a search result including information regarding one or more documents that matches the search request sent by the user, using the search parameters obtained by the instruction analyzer 102 such as the search term determined by the instruction analyzer 102. The search result obtainer 103 may store the search result being obtained in any desired memory such as the RAM 20 or the HDD 40.

The search result processor 104 may generate search result information based on the search result obtained by the search result obtainer 103 for output to the user, for example, through the information output device 130. Further, the search result processor 104 may analyze the search result obtained by the search result obtainer 103 to generate an analysis result for output to the user.

Figure 4:
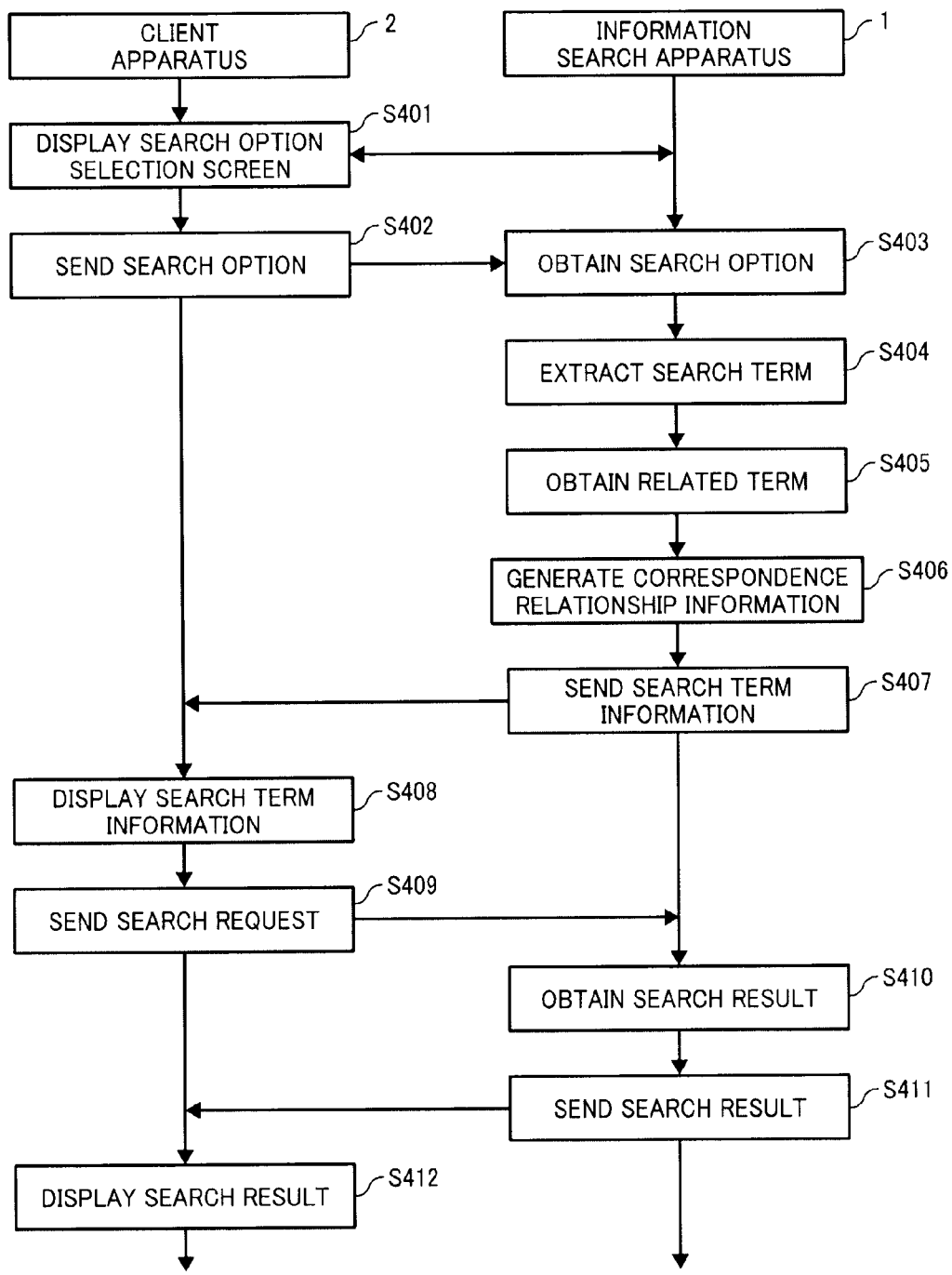
FIG. 4 is a data flow diagram illustrating operation of searching a document, performed by the information search system of FIG. 1, according to an example embodiment of the present invention.

Referring now to FIG. 4, operation of searching a document, performed by the information search system 3, is explained according to an example embodiment of the present invention. In this example, the user at the client apparatus 2 requests the information search apparatus 1 to search the document database 200 to obtain one or more documents that matches the user's need. For the illustrative purpose, it is assumed that the document database 200 stores patent application documents including US patent documents that are published by the USPTO, foreign patent documents that are published, and design patent documents that are published by the USPTO. The foreign patent documents may include, for example, patent application documents published by the World Intellectual Property Organization (WIPO), European Patent Office (EPO), Japanese Patent Office (JPO), etc. The patent application documents may be classified by its type and further stored in different databases based on the classification.

At S401, when the client apparatus 2 receives a user instruction for searching, for example, through the browser program being installed on the client apparatus 2, the client apparatus 2 sends a request to the information search apparatus 1, which requests for information to be displayed to the user that allows the user to input a search option. When the request is received, the client apparatus 2 displays a search option selection screen that allows the user to input a search option.

For example, as illustrated in FIG. 5A or 5B, the client apparatus 2 may display a search option selection screen 300 through the information output device 130. Referring to FIG. 5A or 5B, the search option selection screen 300 includes a document selection section 301, a query selection section 302, and a query input section 303. The document selection section 301 allows the user to specify the type of a collection of documents to be searched. In this example, the user is able to select at least one of the "US patent", "FOREIGN PATENT", and "DESIGN PATENT". The query selection section 302 allows the user to specify how a query is input, which may be used to search a document. In this example, the user is able to select one of the "SENTENCE", "KEYWORD", and "BIBLIOGRAPHIC DATA" options. The query input section 303 allows the user to input a query according to the selected input type of the query selection section 302.

Figures 21, 22:
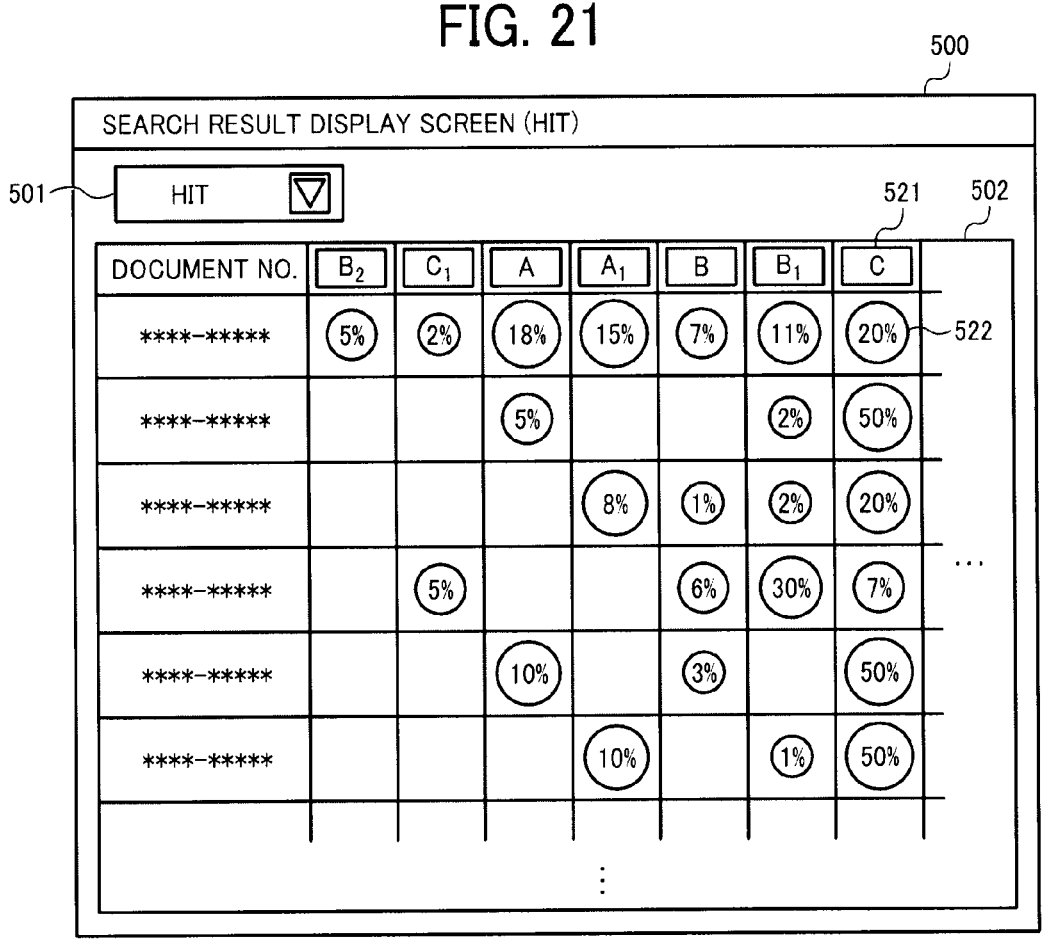
FIG. 21 is an illustration for explaining a search result screen, displayed by the client apparatus of FIG. 1, according to an example embodiment of the present invention.
FIG. 22 is an illustration for explaining bibliographic data.

As illustrated in FIG. 5A or 5B, the query input section 303 of the search option selection screen 300 may change depending on the selected input type of the query selection section 302. For example, the query input section 303 of FIG. 5A corresponds to the example case in which the "SENTENCE" option has been selected by the user as the query input type. In such case, the user may input one or more sentences. In another example, the query input section 303 of FIG. 5B corresponds to the example case in which the "KEYWORD" option has been selected by the user as the query input type. In such case, the user may input one or more keywords such as the terms A, B, and C. In another example, when the "BIBLIOGRAPHIC DATA" is selected as the query input type, the query input section 303 may display a list of bibliographic data available for use. Examples of bibliographic data are illustrated in FIG. 22, which is described below.

The search option selection screen 300 may be not limited to the example cases illustrated in FIG. 5A or 5B. For example, the search option selection screen 300 may allow the user to input a search option using a search formula.

Referring back to FIG. 4, at S402, the client apparatus 2 receives a search option input by the user, for example, through the search option selection screen 300 displayed at S401. For the illustrative purpose, in this example, it is assumed that the user has selected various search options as illustrated in FIG. 5A through the information input device 110 of the client apparatus 2. In such case, the client apparatus 2 sends information regarding the selected search option to the information search apparatus 1 through the network.

At S403, the information search apparatus 1 receives information regarding the selected search option as a user instruction through the network I/F 120. More specifically, the instruction input 101 of the search control device 100 obtains the user instruction, and sends the user instruction to the instruction analyzer 102.

Figure 7A:
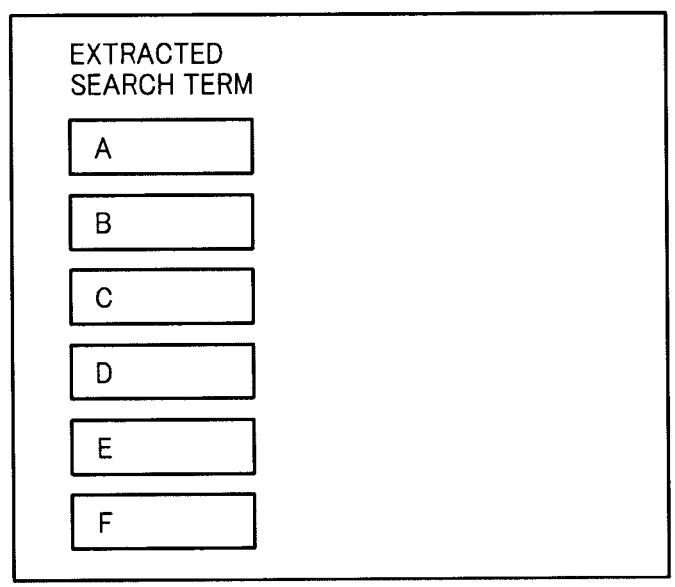
FIG. 7A is an illustration for explaining one or more extracted search terms, obtained and stored by the information search apparatus of FIG. 1, according to an example embodiment of the present invention.

At S404, the instruction analyzer 102 analyzes the user instruction, for example, to determine a search term to be used for searching a document. In this example, the instruction analyzer 102 analyzes the sentence input by the user, and extracts one or more terms from the sentence using the technique such as morphology analysis. The extracted search term may be stored in any desired memory such as the RAM 20. In this example, as illustrated in FIG. 7A, it is assumed that a plurality of search terms A, B, C, D, E, and F are extracted from the sentence input by the user through the search option selection screen 300 of FIG. 5A. In such case, the plurality of extracted search terms A, B, C, D, E, and F may be stored in a memory, for example, in the form of table as illustrated in FIG. 7A. Further, the instruction analyzer 102 may generate search term identification information, which may be used to uniquely identify each search term that has been extracted.

Figure 7B:
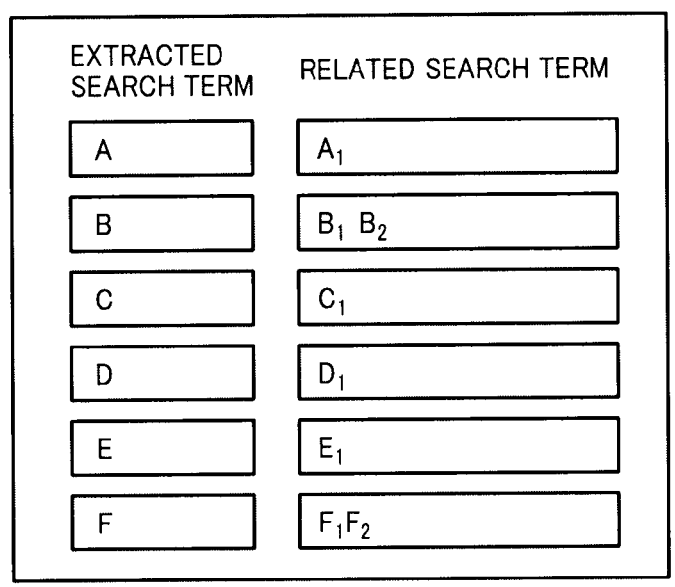
FIG. 7B is an illustration for explaining one or more related search terms, obtained and stored by the information search apparatus of FIG. 1, according to an example embodiment of the present invention.

At S405, the instruction analyzer 102 may further obtain, for each extracted search term, one or more related search terms that are assumed to be related to the extracted search term, for example, using the dictionary DB 140. The obtained related search term may be stored in any desired memory such as the RAM 20 for each extracted search term such that it may be used to search a document together with the extracted search term. In this example, as illustrated in FIG. 7B, it is assumed that the instruction analyzer 102 obtains a related search term A1 and a related search term A2 for the extracted search term A, a related search term B1, a related search term B2, and a related search term B3 for the extracted search term B, a related search term C1 for the extracted search term C, a related search term D1 and a related search term D2 for the extracted search term D, a related search term E1 for the extracted search term E, and a related search term F1 and a related search term F2 for the extracted search term F. In such case, the related search term that corresponds to each extracted search term extracted may be stored, for each extracted search term, for example, in the form of table as illustrated in FIG. 7B. Further, the instruction analyzer 102 may generate search term identification information, which may be used to uniquely identify each search term that has been obtained.

At S406, the instruction analyzer 102 generates correspondence relationship information indicating the correspondence relationship between the extracted search term obtained at S404 and the related search term obtained for the extracted search term at S405.

At S407, the instruction analyzer 102 sends search term information regarding the search term previously obtained based on search option to the client apparatus 2 through the network I/F 120. The search term information may include, for example, information regarding the extracted search term obtained at S404, the related search term obtained at S405, the identification information generated for each search term, and the correspondence relationship generated for each group of the extracted search term and the related search term.

At S408, the client apparatus 2 receives the search term information from the information search apparatus 1, and displays the search term information to the user through the information output device 130.

Figure 8A:
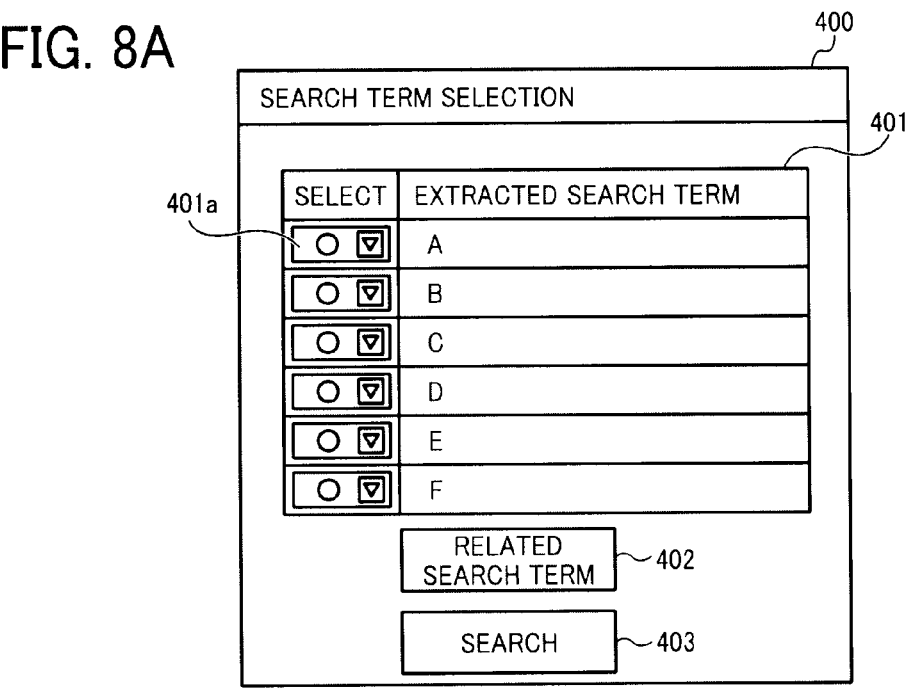
FIG. 8A is an illustration for explaining a search term selection screen, displayed by the client apparatus of FIG. 1, according to an example embodiment of the present invention.
Figure 8B:
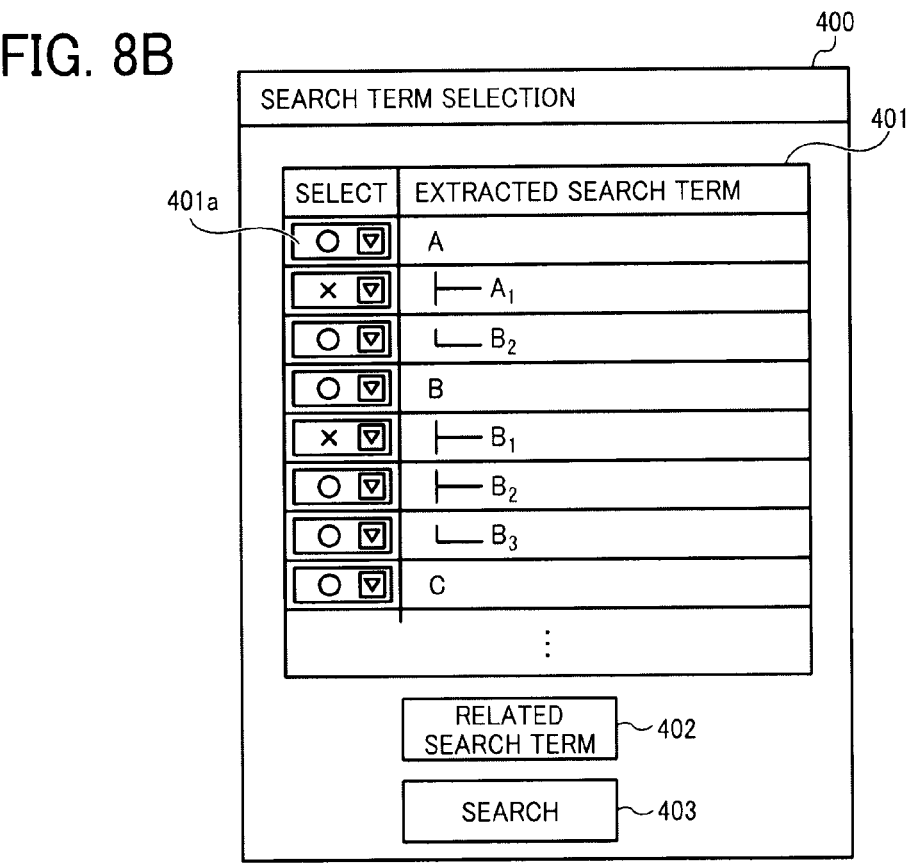
FIG. 8B is an illustration for explaining a search term selection screen, displayed by the client apparatus of FIG. 1, according to an example embodiment of the present invention.

For example, referring to FIG. 8A or 8B, the client apparatus 2 may display a search term selection screen 400 to the user through the information output device 130. The search term selection screen 400 includes a search term display section 401, a screen switch section 402, and a search request section 403.

The search term display section 401 displays a plurality of search terms extracted by the information search apparatus 1 at S404 and S405. In one example, as illustrated in FIG. 8A, the search term display section 401 may display only the extracted search term, which has been extracted from the sentence input by the user. In another example, as illustrated in FIG. 8B, the search term display section 401 may additionally display the related search term, which has been obtained by the information search apparatus 1 with respect to the extracted search term.

The screen switch section 402 allows the user to switch between the search term display section 401 of FIG. 8A and the search term display section 401 of FIG. 8B. For example, when the user selects the screen switch section 402 by the information input device 110 such as a mouse while the search term selection screen 400 of FIG. 8A is displayed, the search term display section 401 of FIG. 8A is switched to the search term display section 401 of FIG. 8B. With the screen switch section 402, the user may easily distinguish between the extracted search term and the related search term.

In this example, referring to FIG. 8B, the search term display section 401 displays the correspondence relationship between the extracted search term obtained at S404 and the related search term obtained at S405. Specifically, in this example, such correspondence relationship is represented by the line that connects between the extracted search term and the related search term. With this representation, the user may easily recognize which related search term has been obtained by the information search apparatus 1 for which extracted search term input by the user.

Still referring to FIG. 8A or 8B, the search term display section 401 may be additionally provided with a search term selection section 401a. In this example, the user may cause the display of the search term selection section 401 to be switched between the mark "O" and the mark "X", for example, using the information input device 110. With this selection of one of the marks, the user is able to select one or more search terms to be used for searching a document.

Figure 6:
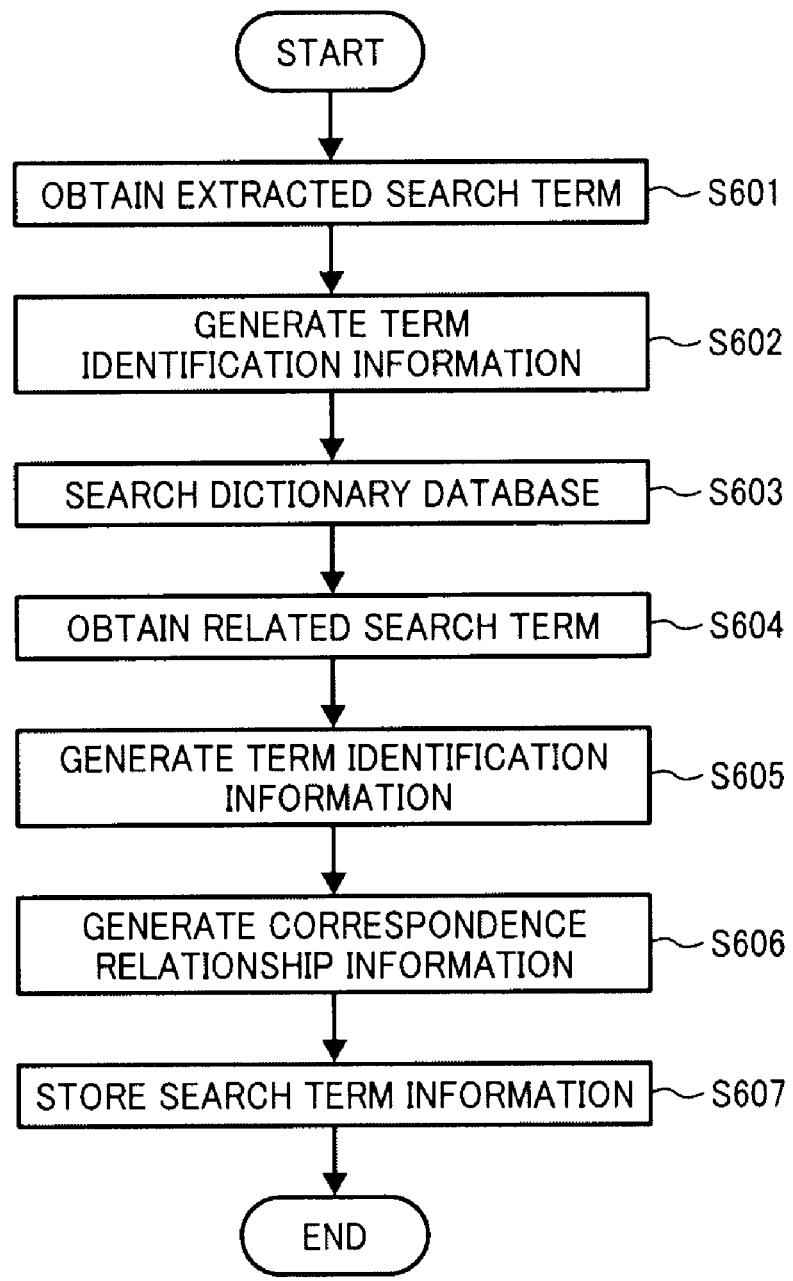
FIG. 6 is a flowchart illustrating operation of generating search term information, performed by the information search apparatus of FIG. 1, according to an example embodiment of the present invention.

Referring now to FIG. 6, operation of generating search term information is explained according to an example embodiment of the present invention. The operation of FIG. 6 may be performed by the instruction analyzer 102 concurrently with S404 to S406 of FIG. 4.

S601 obtains the extracted search term in a substantially similar manner as described at S404.

S602 generates search term identification information for the extracted search term. For example, a search term ID may be generated and assigned to the extracted search term.

S603 searches the dictionary DB 140 using the extracted search term as a key.

S604 obtains one or more related search terms for the extracted search term.

S605 generates search term identification information for the related search term. For example, a search term ID may be generated for each one of the related search terms. Each one of the related search terms is assigned with the corresponding search term ID. In another example, the same search term ID may be generated for each one of a group of the related search terms corresponding to the same extracted search term.

S606 generates correspondence relationship information indicating the correspondence relationship between the extracted search term and one or more related search terms corresponding to the extracted search term. For example, a search term group ID may be generated for a group of the extracted search term and the related search terms, and assigned to the group of the extracted search term and the related search terms.

S607 stores search term information, which includes information regarding the extracted search term obtained at S601, the term identification information for the extracted search term obtained at S602, the related search term obtained at S604, the term identification information for the related search term obtained at S605, and the correspondence relationship information obtained at S606.

Referring back to FIG. 4, when the search request section 403 of FIG. 8A or 8B is selected, for example, through the information input device 110, at S409, the client apparatus 2 sends a search request to the information search apparatus 1 through the network. In this example, information regarding the selected search term, which has been selected by the user through the search term selection screen 400 of FIG. 8A or 8B at S408, is sent together with the search request.

At S410, the search result obtainer 103 obtains information regarding various search parameters to be used for searching a document, for example, from the instruction analyzer 102. The search result obtainer 103 may also obtain information regarding the search term selected by the user from the client apparatus 2 as one of the search parameters. Using the search parameters, the search result obtainer 103 searches the document database 200 to obtain a search result.

In this example, it is assumed that the information search apparatus 1 searches the collection of "US patent" documents according to the search option selected by the user through the search option selection screen 300 of FIG. 5A, using the search term selected by the user through the search term selection screen 400 of FIG. 8B. Referring to FIG. 8B, the search term includes the terms A, A2, B, B2, B3, and C. In such case, the search result obtainer 103 searches the collection of US patent documents stored in the document database 200 for each of the search terms A, A2, B, B2, B3, and C to obtain a search result for each search term. More specifically, for each search term, the search result obtainer 103 calculates the term frequency indicating how frequent the search term appears in each US patent document, and obtains a predetermined number of documents having the highest term frequencies as a search result. The search result obtained for each search term may be stored in any desired memory such as the RAM 20. The predetermined number may be previously set by default or according to the user preference. For example, the user may input the predetermined number as a search option at the time of requesting for search.

For example, as illustrated in FIG. 9, the search result may be stored in the form of table, which includes information regarding the term frequency ("HIT"), the search term ("SEARCH TERM"), and the searched document ("DOCUMENT NO."). Further, the search result obtainer 103 may generate correspondence relationship information indicating the correspondence relationship of the term frequency, the search term, and the searched document. For example, as illustrated in FIG. 9, a search result ID ("ID") is assigned to each group of the term frequency, the search term, and the document. Still referring to FIG. 9, the search result ID "001" may be used to identify a specific group of the term frequency "328", the search term A, and the document having the document ID of "xxxx/xxxxxxa". The search result ID "001" indirectly indicates that the term frequency of the search term A within the document having the document number "xxxx/xxxxxxa" is 328. Alternatively, the search result ID "001" may be used to derive the term frequency of 328.

Once the term frequency for each document is obtained for each search term, the search result obtainer 103 may store the search result in any desired memory such as the RAM 20. Further, the search result obtainer 103 may cause a search result processor 104 to organize the search result being obtained into a search result matrix illustrated in FIG. 11.

Figures 10, 11:
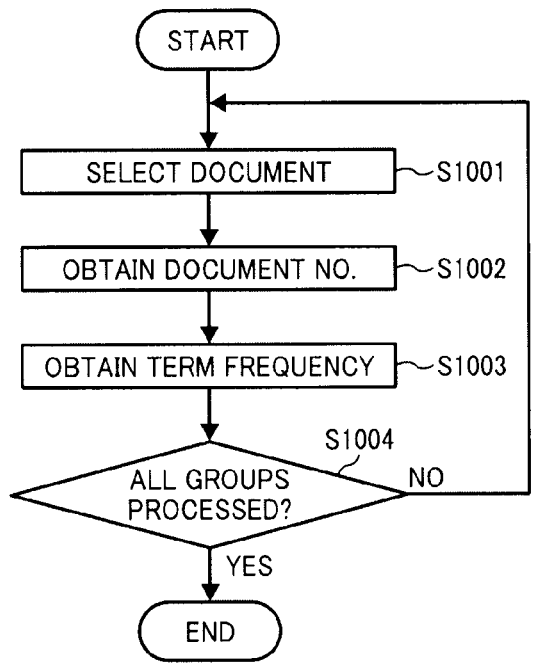
FIG. 10 is a flowchart illustrating operation of analyzing the search result of FIG. 9 to generate a search result matrix, according to an example embodiment of the present invention.
FIG. 11 is an illustration for explaining the search result matrix generated based on the search result of FIG. 9, according to an example embodiment of the present invention.

Referring to FIG. 10, operation of generating a search result matrix is explained according to an example embodiment of the present invention. The operation of FIG. 10 may be performed by the search result processor 104.

At S1001, the search result processor 104 selects one searched document for processing, and obtains one or more groups of term frequency, search term, and document that are related to the selected search document. For example, referring back to FIG. 9, when the searched document having the document number "xxxx/xxxxxxa" is selected, the search result processor 104 obtains the groups of term frequency, search term, and document assigned with the ID "001", "011", "021", and "101".

At S1002, the search result processor 104 obtains identification information regarding the selected searched document such as the document number "xxxx/xxxxxxa" being assigned to the searched document.

At S1003, the search result processor 104 obtains information regarding the term frequency for each one of the groups of term frequency, search term, and document obtained at S1001.

At S1004, the search result processor 104 determines whether the search results, or the groups of term frequency, search term, and document have been processed for all documents. When it is determined that the search results have been processed for all documents ("YES" at S1004), the operation ends. When it is determined that the search result have not been processed for all documents ("NO" at S1004), the operation returns to S1001 to repeat S1001 to S1003.

With this operation of FIG. 10, the search result processor 104 may generate the search result matrix, for example, as illustrated in FIG. 11. The search result matrix of FIG. 11 includes a row vector having a plurality of matrix elements each representing the search term, and a column vector having a plurality of matrix elements each representing the document that matches the search term. Each cell of the search result matrix, which is provided at the intersection of the row and the column, includes the term frequency indicating how frequent the corresponding search term is included in the corresponding document. For example, the cell positioned at the upper left indicates that the term frequency of the search term A for the document having the document number "xxxx/xxxxxxa" is 328. The search result matrix of FIG. 11 may be stored in any desired memory. Alternatively, in this example, the row vector and the column vector may be generated so as to respectively represent the document and the search term.

Once the search result matrix is generated, the search result processor 104 may use the search result matrix to obtain a relevancy value for each document, which indicates the degree of relevancy between the plurality of search terms and the document, for example, by applying a predetermined conversion equation to the search result matrix.

In one example, based on the relevancy value, the search result processor 104 may select one or more documents to be displayed to the user as the search result. For example, the search result processor 104 may select the document having the relevancy value higher than a predetermined threshold value. The threshold value may be previously determined by default or according to the user's preference, which may be stored in any desired memory. Alternatively, the search result processor 104 may select the document with the high relevancy value until the number of selected documents reaches a predetermined threshold value. The threshold value may be previously determined by default or according to the user's preference. For example, the user may input the threshold value as a search option at the time of requesting for search.

Referring back to FIG. 4, after one or more documents for display are selected, the search result processor 104 may send information regarding the selected documents to the client apparatus 2 as a search result. Such selected document information may include, for example, any information obtainable from the search result matrix of FIG. 11 for the selected document, the relevancy value of the selected document being obtained, and any attribute information obtainable from the selected document such as the title of the document. The attribute information may be obtained from the document database 200 using the document number.

At S412, the client apparatus 2 displays the search result obtained from the information search apparatus 1 to the user, and the operation ends. For example, the client apparatus 2 may display a search result screen 500 illustrated in FIG. 12 or FIG. 13. The search result screen 500 of FIG. 12 or FIG. 13 includes a display format selection section 501 and a search result display section 502.

The display format selection section 501 allows the user to select the view or contents of the search result obtained in response to the search request sent by the user. Through the information input device 110 of the client apparatus 2, the user may change the view or the contents of the search result being displayed on the search result display section 502.

In one example, as illustrated in FIG. 12, the user may select the "RELEVANCY VALUE" option through the display format selection section 501 to cause the search result display section 502 to display thereon the search result that shows a list of documents that have the highest relevancy values. In this example, information regarding the selected document includes the document number, the document title, and the relevancy value. Alternatively, any other information regarding the selected document may be displayed. Further, in this example, the documents are displayed in a predetermined order from the document having the highest relevancy value to the document having the lowest relevancy value.

Figure 13:
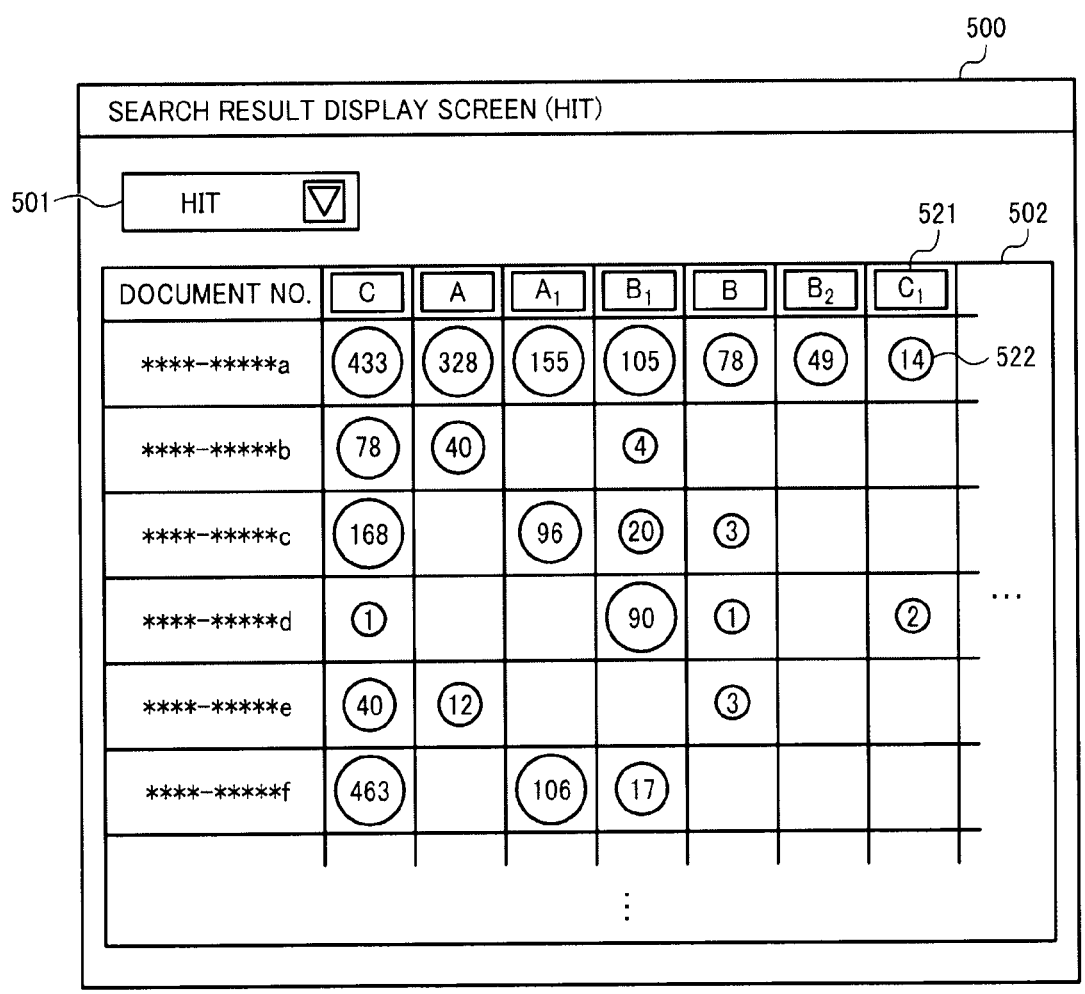
FIG. 13 is an illustration for explaining a search result screen, displayed by the client apparatus of FIG. 1, according to an example embodiment of the present invention.

In another example, as illustrated in FIG. 13, the user may select the "HIT" option through the display format selection section 501 to cause the search result display section 502 to display thereon the search result in the form of matrix, which may be generated based on the search result matrix that has been generated at S410 or the search result obtained at S410. In this example, information regarding the document such as the document number is displayed in the rows, and information regarding the search term is displayed in the columns.

Further, each cell includes term frequency information regarding the term frequency indicating how frequent the corresponding search term is included in the corresponding document. More specifically, in this example illustrated in FIG. 13, the term frequency information includes numerical data indicating the term frequency in numerical value, and graphical data visually representing the term frequency in circular shape. The dimension of the circular shape corresponds to the term frequency value such that it may help the user to look and feel the term frequency value without checking the numerical data.

Further, in this example illustrated in FIG. 13, the documents are listed in the order from the document having the highest relevancy value to the document having the lower relevancy value. The search terms are listed in the order from the search term having the highest term frequency for the document having the highest relevancy value to the search term having the lowest term frequency for the document having the highest relevancy value.

Alternatively, the documents or the search terms may be arranged in any order different from the order described referring to FIG. 13. For example, the search terms may be arranged in the order from the search term having the highest total term frequency value obtained for all selected documents being displayed, to the search term having the lowest total term frequency value obtained for all selected documents being displayed. In order to obtain the total term frequency value for the target search term, the term frequency values for all selected documents are added such that the resultant total term frequency value indicates how frequent the search term is included in all documents being displayed. Alternatively, the order of arranging the search term or document may be selected by the user.

As described above referring to FIG. 12 or 13, the display format selection section 501 allows the user to change the contents or view of various types of information obtainable from the search result such that the user may easily analyze the search result. For example, when the user prefers to analyze the search result to obtain one or more documents that are most relevant to the search option input by the user, the user may select the "RELEVANCY VALUE" option to cause the information output device 130 to display the search result screen 500 of FIG. 12.

In another example, when the user prefers to analyze the search result to determine one or more search terms that are most likely to lead the user to a desired document, the user may select the "HIT" option to cause the information output device 130 to display the search result screen 500 of FIG. 13. From the search result matrix that shows the correspondence relationship between the search term and the document, the user may be able to determine a combination of search terms that are most likely to lead the user to a desired document. Once the user has determined a combination of search terms to be used for searching, the user may request the client apparatus 2 to display a search result based on the selected combination of search terms, for example, by inputting information regarding the selected combination of search terms through the search term selection screen 400 of FIG. 8A or 8B, which may be displayed together with the search result screen 500 of FIG. 13. When such request is received, the client apparatus 2 may only display the search result that corresponds to the selected combination of search terms. This may be easily performed, for example, by extracting the column that corresponds to the selected search term.

The operation of FIG. 4 may be performed in various other ways. For example, the steps illustrated in FIG. 4 may be performed in the order different from the order described above.

Figure 14:
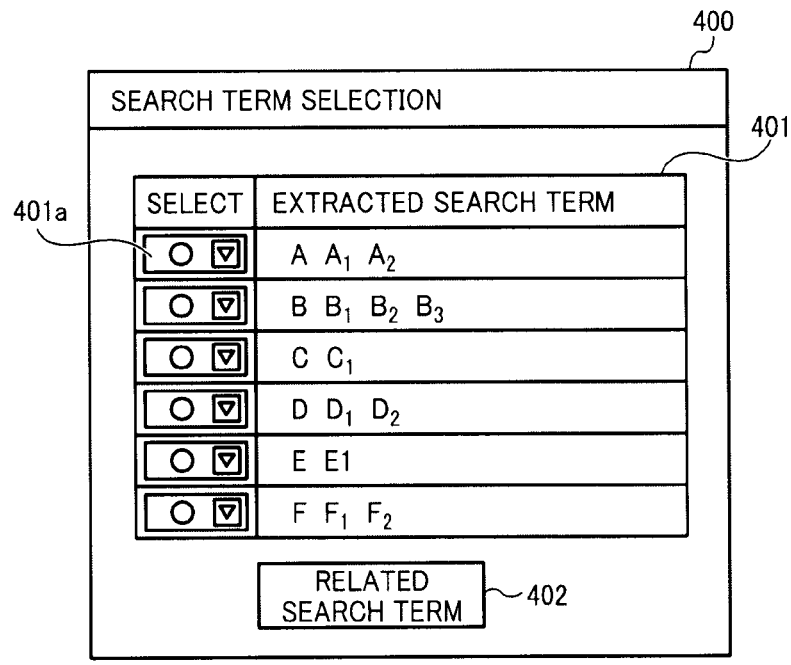
FIG. 14 is an illustration for explaining a search term selection screen, displayed by the client apparatus of FIG. 1, according to an example embodiment of the present invention.

In another example, the correspondence relationship between the extracted search term and the related search term may be displayed in any form other than the search term selection screen 400 illustrated in FIG. 8A or 8B. In one example, as illustrated in FIG. 14, the extracted search term and the corresponding related search terms may be displayed in the same raw using the correspondence relationship information.

Figure 15:
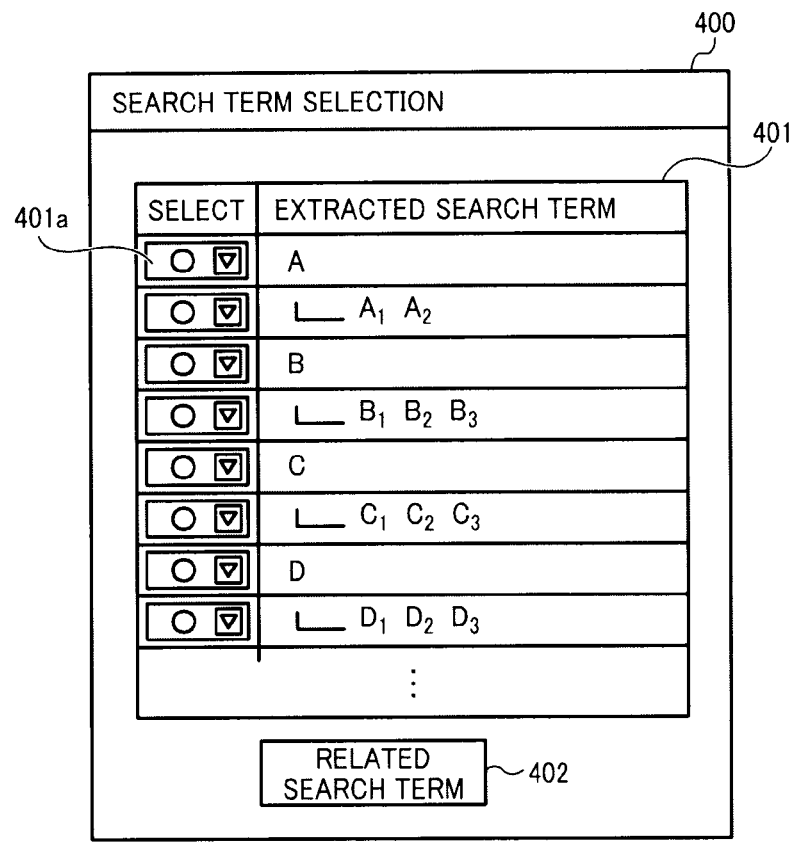
FIG. 15 is an illustration for explaining a search term selection screen, displayed by the client apparatus of FIG. 1, according to an example embodiment of the present invention.

In another example, as illustrated in FIG. 15, all related search terms may be displayed in the same raw below the raw including the corresponding extracted search term. In another example, as illustrated in FIG. 16, the search terms may be displayed such that one raw includes only one search term.

Figure 16:
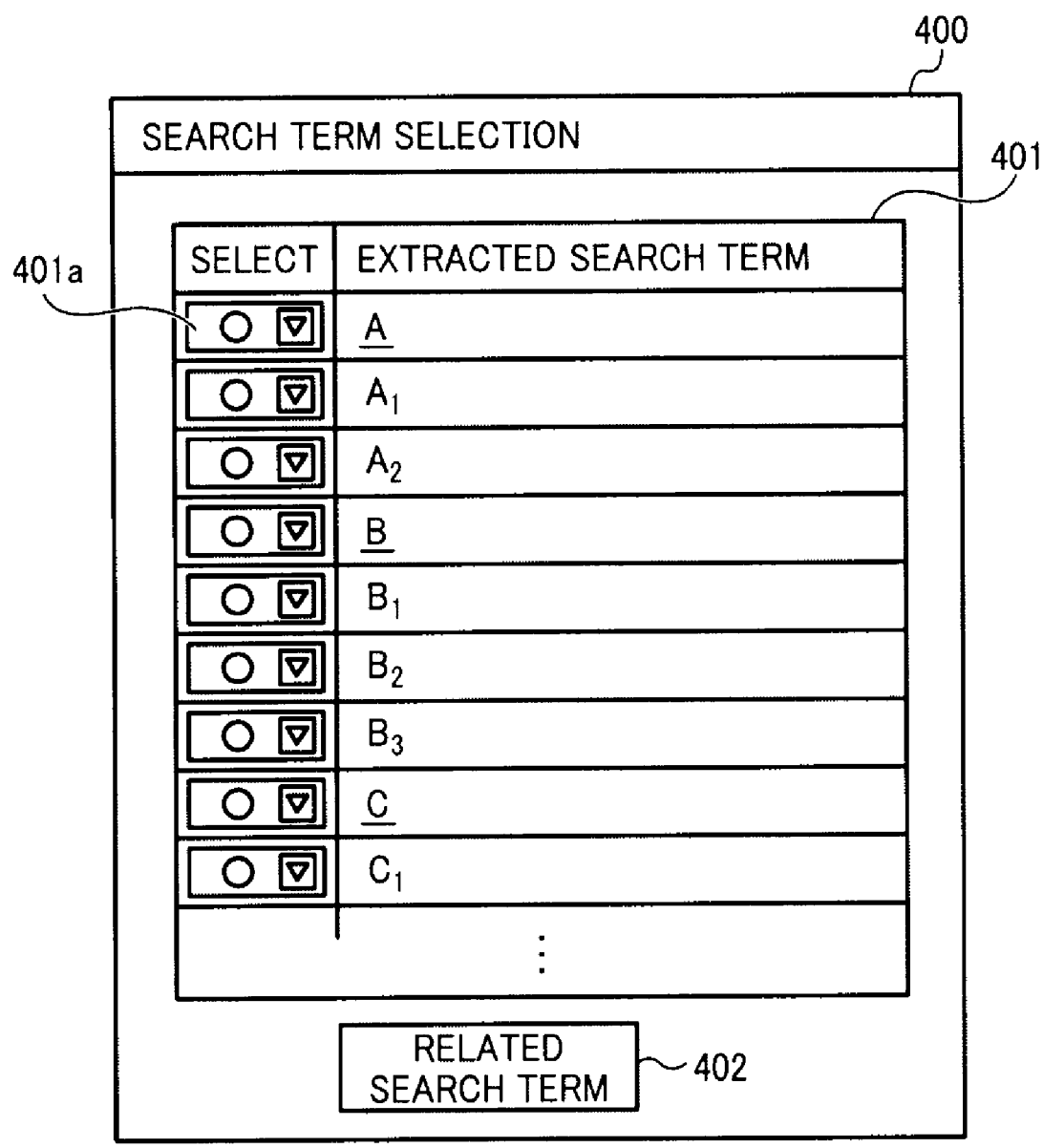
FIG. 16 is an illustration for explaining a search term selection screen, displayed by the client apparatus of FIG. 1, according to an example embodiment of the present invention.

Still referring to FIG. 16, the appearance of the extracted search term being displayed differs from the appearance of the related search term being displayed. By causing the appearance of the extracted search term different from the appearance of the related search term, the user may easily recognize which search term corresponds to the user's query and which search term corresponds to the term automatically selected by the information search apparatus 1.

In the example cases illustrated in FIG. 15 or 16, the search term identification information to be assigned to the extracted search term and the search term identification information to be assigned to the related search term may be generated according to a specific rule such that the extracted search term and the related search term are distinguishable.

In another example, the search result, which may be displayed through the search result screen 500 of FIG. 13, may additionally display the correspondence relationship between the extracted search term and the related search term. For example, referring to FIG. 13, the extracted search terms C, A, and B are displayed in different colors. The related search terms that correspond to the same extracted search term are displayed in the same color as the color of the same extracted search term. More specifically, the related search term A1 is displayed in black, which is the same color of the corresponding extracted search term A. The related search terms B1 and B2 are displayed in red, which is the same color of the corresponding extracted search term B. The related search term C1 is displayed in blue, which is the same color of the corresponding extracted search term C. By displaying the correspondence relationship between the extracted search term and the related search term, the user may easily recognize which search terms are related. In order to display the correspondence relationship, the search result processor 104 may determine the color of each search term using any one of the search term information, which is obtained as described above referring to FIG. 6.

In another example, as described above referring to FIG. 5B, the user may select the "KEYWORD" option through the query selection section 302. In such case, at S404, the instruction analyzer 102 obtains one or more search terms input by the user as the extracted search term.

In another example, S407, S408, and S409 may not be performed. In such case, after the extracted search term and the related search term are obtained, the information search apparatus 1 may perform search using the obtained search terms to generate a search result to be displayed to the user. The information search apparatus 1 may send information regarding the extracted search term and the related search term in addition to the search result to be displayed to the user. For example, in addition to the search result screen 500, the client apparatus 2 may display the search term selection screen 400, which allows the user to select one or more search terms. In such case, the search term selection screen 400 may additionally display information regarding how frequent each search term is used in the searched documents.

Referring back to FIG. 13, the search result screen 500 is explained in more detail. The search result screen 500 may additionally include a sort selection section 521 and a document display section 522. As illustrated in FIG. 13, the sort selection section 521 may be displayed, for example, in the section where each search term is displayed. Further, the document display section 522 may be displayed, for example, in the section where the term frequency information is displayed.

When selected by the user, the document display section 522 causes the information output device 130 to display information indicating a portion of the corresponding document having the corresponding search term. For example, as illustrated in FIG. 13, when the document display section 522, which is displayed together with the term frequency information for the search term C1 and the document "xxxx/xxxxxxa", is selected by the user, a document screen 600 of FIG. 17 may be displayed to the user additionally or alternatively to the search result screen of FIG. 13.

Figure 17:
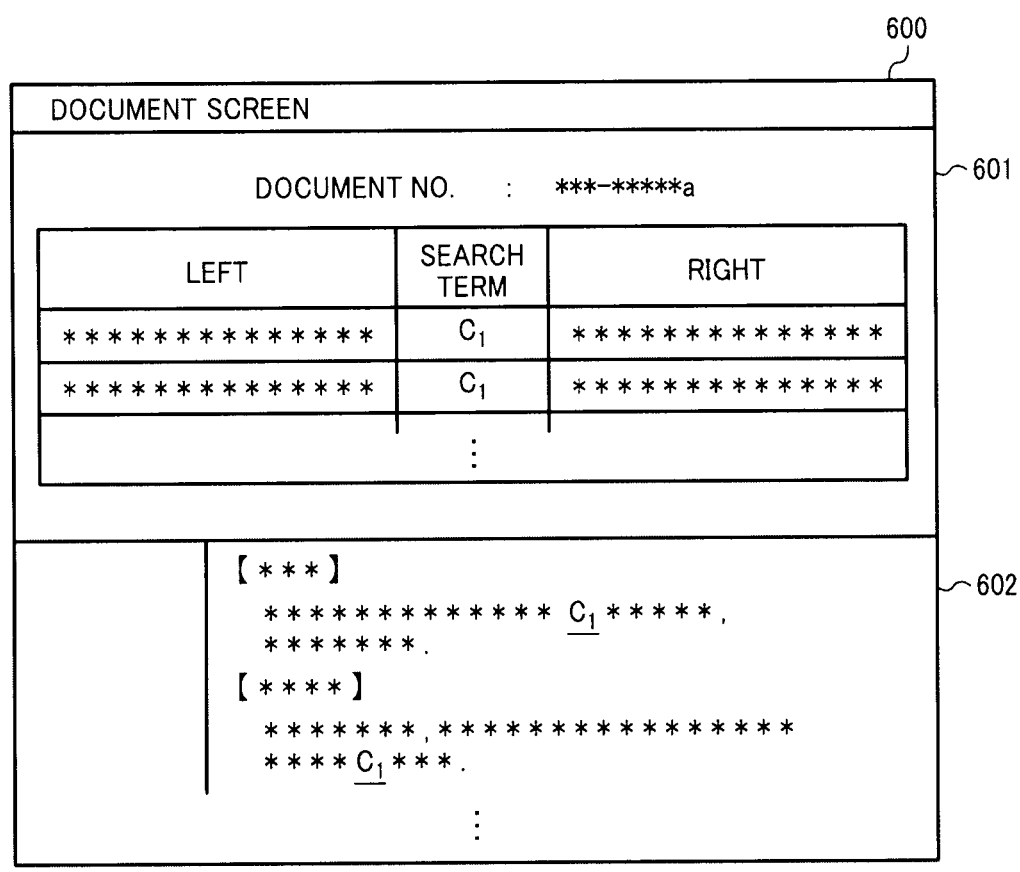
FIG. 17 is an illustration for explaining a document screen, displayed by the client apparatus of FIG. 1, according to an example embodiment of the present invention.

Referring to FIG. 17, the document screen 600 includes a context display section 601 and a contents display section 602. The context display section 601 displays, for each search term being included in a specific portion of the document, one or more words that appear right before the search term at left, and one or more words that appear right after the search term at right. The contents display section 602 displays the contents of the document. As illustrated in FIG. 17, the search term is displayed differently from any other words in the contents. For example, the search term may be displayed in bold font with underline. Alternatively, the search term may be displayed in color different from the color of the other words.

In order to display the document screen 600, the client apparatus 2 may request the information search apparatus 1 to send information regarding the selected search term and the selected document. For example, referring to FIG. 13, the selected document display section 522 may include information that may be used to identify the corresponding document and the corresponding search term, such as the search result ID that has been assigned to the group of the term frequency, the search term, and the document as described above referring to FIG. 9. When the selected document display section 522 is selected by the user through the information input device 110 of the client apparatus 2, the client apparatus 2 obtains the search result ID, and sends an instruction to the information search apparatus 1 together with information regarding the obtained search result ID.

When the request is received, the search result processor 104 of the information search apparatus 1 obtains the document number that corresponds to the search result ID, and the search term that corresponds to the search result ID, for example, from the table illustrated in FIG. 9. Once the document number is identified, the search result processor 104 obtains the document having the identified document number from the document database 200 using the document number as a key. Based on the document and the identified search term, the search result processor 104 may generate information to be displayed as the document display section 600.

Since the document display section 600 only displays the search term that has been selected by the user, the user may easily recognize how the search term is used in the document. This improves the usability especially when many search terms have been used to obtain the document.

Figure 18:
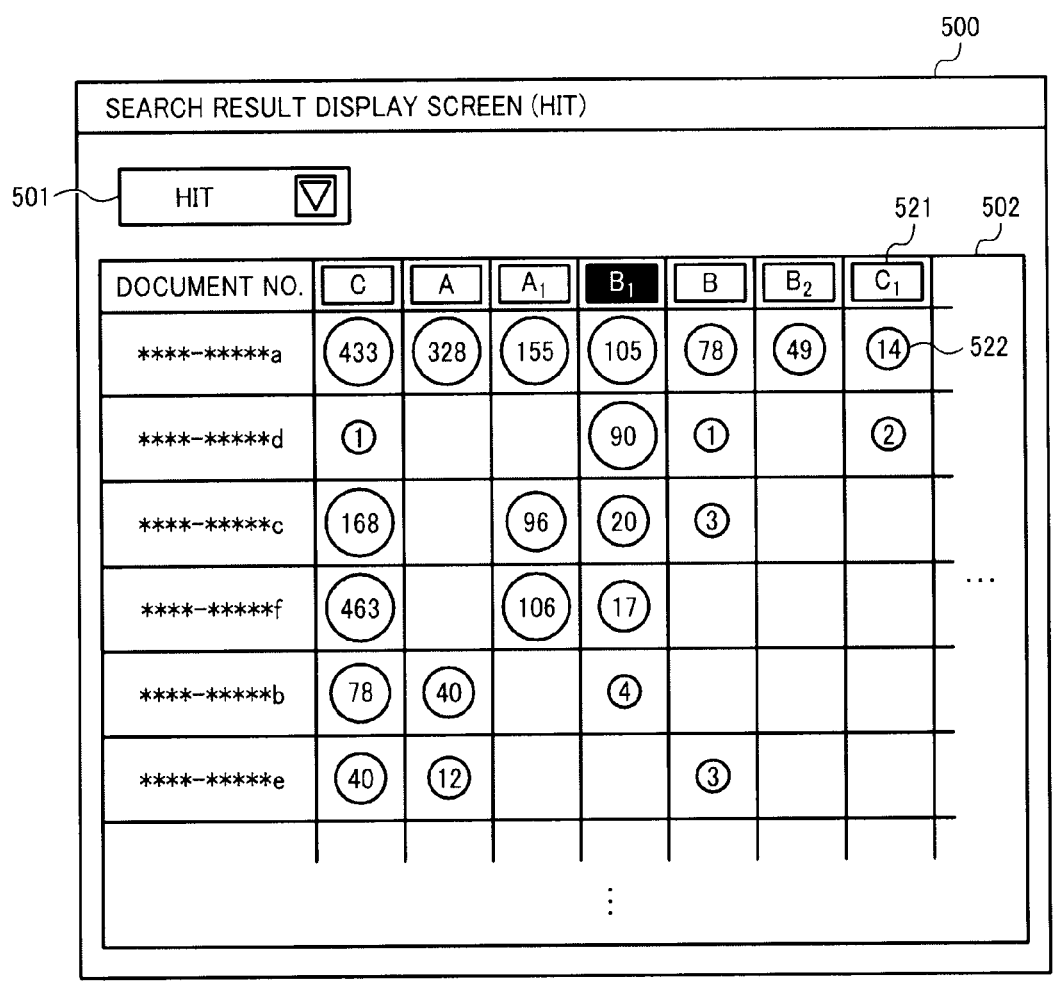
FIG. 18 is an illustration for explaining a search result screen, displayed by the client apparatus of FIG. 1, according to an example embodiment of the present invention.

Referring back to FIG. 13, the sort selection section 521 may be selected by the user, which allows the user to change the view of the search result. For example, when the sort selection section 521 that corresponds to the search term B1 is selected, as illustrated in FIG. 18, the documents are displayed in the order from the document having the highest term frequency for the search term B1 to the document having the lowest term frequency for the search term B1. In such case, the sort selection section 521 that corresponds to the search term B1 may be displayed differently from the sort selection sections 521 that correspond to other search terms. With this function, the user is able to sort the documents by any desired search term.

More specifically, when the sort selection section 521 that corresponds to the search term B1 is selected, for example, through the information input device 110 of the client apparatus 2, the client apparatus 2 may send an instruction for sorting to the information search apparatus 1 together with information regarding the selected search term. When the instruction for sorting is received by the information search apparatus 1 through the network I/F 120, the search result processor 140 may generate information according to the instruction for sorting, and send the information to the client apparatus 2 for display to the user.

Figure 19:
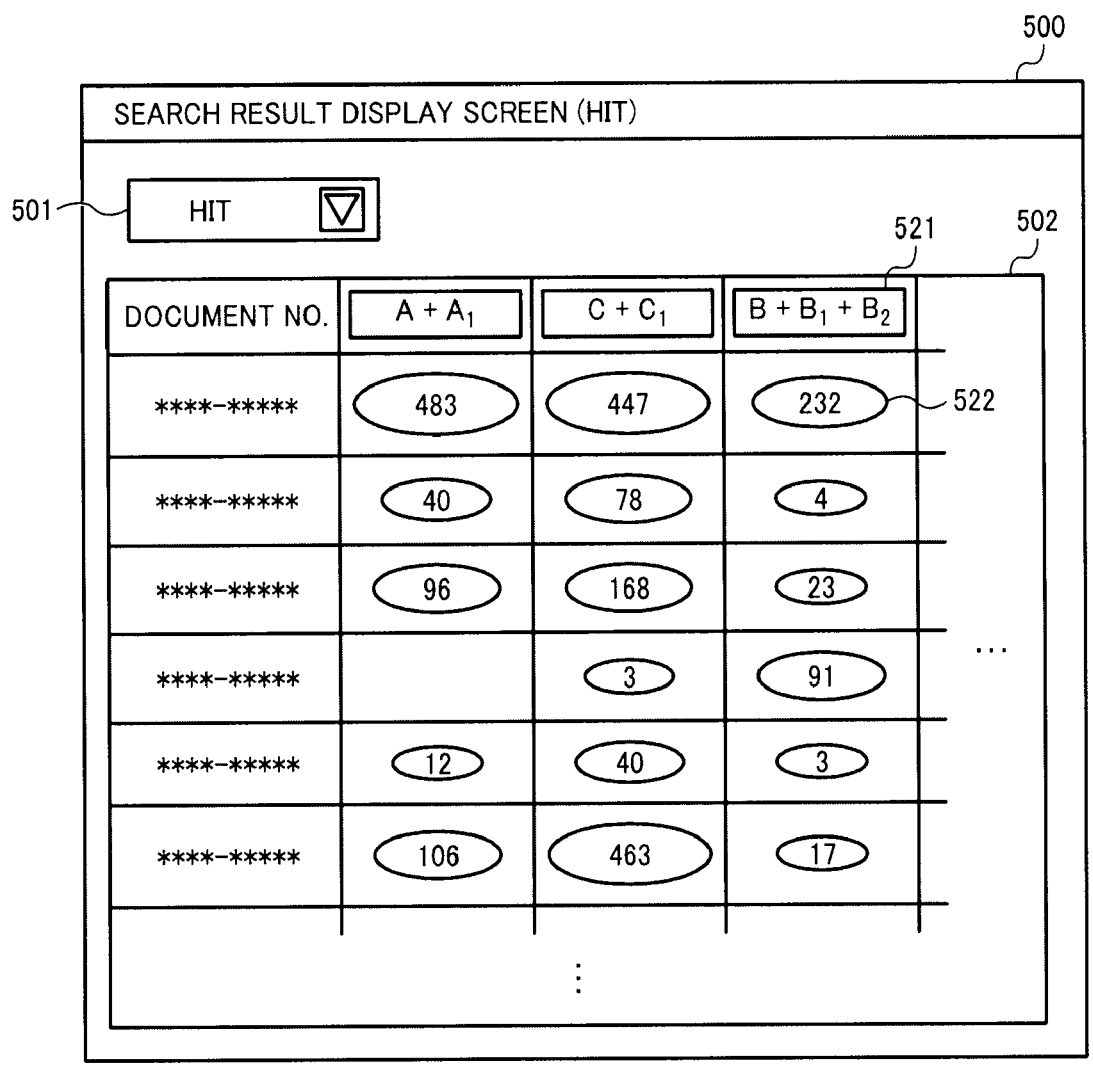
FIG. 19 is an illustration for explaining a search result screen, displayed by the client apparatus of FIG. 1, according to an example embodiment of the present invention.

In this example, the search result screen 500 of FIG. 13 may be implemented in various other ways. For example, as illustrated in FIG. 19, the search results for the extracted search term and the corresponding related search terms may be combined into one search result. Referring to FIG. 19, the search result for the extracted search term A and the search result for the related search term A1 are combined into the search result that indicates how frequent the extracted search term A or the related search term A1 appears in the corresponding document. The search result for the extracted search term C and the related search term C1 are combined into the search result that indicates how frequent the extracted search term C or the related search term C1 appears in the corresponding document. The search result for the extracted search term B, the related search term B1, and the related search term B2 are combined into the search result that indicates how frequent the extracted search term B, the related search term B1, or the related search term B2 appears in the corresponding document. Any one of the information search apparatus 1 and the client apparatus 2 may generate the search result screen 500 based on the search result matrix of FIG. 11, for example, by default or according to the user preference.

Still referring to FIG. 19, the search result screen 500 includes the display format selection section 501, the search result display section 502, the sort selection section 521, and the document display section 522, as described above referring to FIG. 13. For example, when the document display section 522, which is displayed together with the term frequency information for the search terms B, B1, and B2 and the document "xxxx/xxxxxxa", is selected by the user, a document screen that is similar to the document screen 600 of FIG. 17 may be displayed to the user. Compared to the example case of the document screen 600 of FIG. 17, the document screen displays each of the search terms B, B1, and B2 in at least one of the context display section 601 and the contents display section 602. The search terms B, B1, and B2 may be displayed differently, for example, in different colors.

In another example, the documents, which are listed vertically as rows in FIG. 13, may be listed horizontally as columns. In such case, the search terms, which are listed horizontally as columns in FIG. 13, may be listed vertically as rows. Such layout of the search result display section 502 may be changed by default or according to the user preference. For example, the client apparatus 2 or the information search apparatus 1 may respectively count the number of samples to be listed as the searched document and the number of samples to be listed as the search terms, and compare the counted values. Based on the comparison, the client apparatus 2 or the information search apparatus 1 may determine the layout of the search result display section 502 such that information having the higher counted value is listed vertically as rows. This allows the user to easily scroll up or down the search result display section 502, for example, through the input device 130 such as the mouse.

Figure 20:
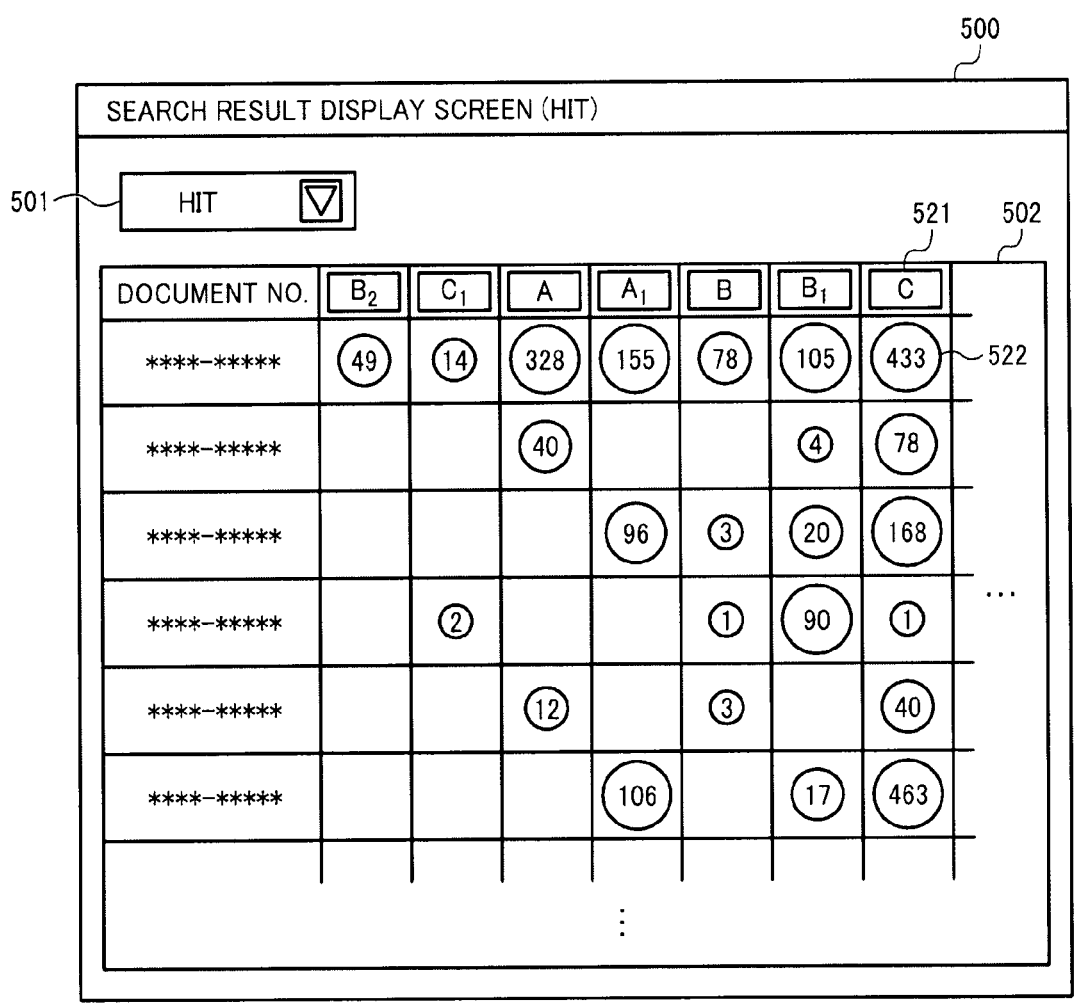
FIG. 20 is an illustration for explaining a search result screen, displayed by the client apparatus of FIG. 1, according to an example embodiment of the present invention.

In another example, any one of the documents and the search terms may be listed in the order differently from the order determined based on the term frequency. For example, the search terms may be listed in the order determined based on the document frequency indicating the number of documents in which the corresponding search term appears. When the search term has the low document frequency, the search term may be a useful search term, which may be recommended for use in searching a document. When the search term has the high document frequency, the search term may not be a useful search term as the search term is commonly used throughout a large number of documents. Based on this analysis, as illustrated in FIG. 20, the search terms may be listed in the order from the search term having the lowest document frequency to the search term having the highest document frequency. Referring to FIG. 20, each cell includes information regarding the document frequency, which indicates the number of documents in which the corresponding search term is included.

In another example, the documents or the search terms may be listed in the order determined based on the score ratio indicating the degree of contribution that each search term has made with respect to the relevancy value of each document. In such case, each cell of the search result matrix may include information regarding the score ratio of a corresponding search term n for a corresponding document, which may be obtained by dividing the score S(n) of the corresponding search term n by the relevancy value R of the corresponding document.

The score S(n) of the search term n is obtained by the following equations:

$$R = \Sigma(i, n=1) S(n),$$

wherein R is the relevancy value of the document, and i is the number of search terms included in the document;

$$S(n) = H(n) * W(n),$$

wherein H(n) is the term frequency of the search term n and W(n) is a weighting factor of the search term n; and $$W(n) = \text{Log}(N/Df(n)),$$

wherein N is the number of documents that are subjected for searching such as the number of US patent documents stored in the document database 200, and Df(n) is the document frequency of the search term n.

For example, the score ratio may be calculated for each search term n for each document using the above-described equations, and displayed as the search result, for example, as illustrated in FIG. 21. Referring to FIG. 21, each cell of the search result matrix includes score ratio information regarding the score ratio indicating the degree of contribution that each search term has made with respect to the relevancy value of each document. More specifically, in this example illustrated in FIG. 21, the score ratio information includes numerical data indicating the score ratio in numerical value, and graphical data visually representing the score ratio in circular shape. The dimension of the circular shape corresponds to the score ratio value such that it may help the user to look and feel the score ratio value without checking the numerical data.

Alternatively, each cell of the search result matrix shown in FIG. 21 may include score information regarding the score indicating the relevancy value of each search term with respect to each document, which may be obtained using the above-described equations.

Referring now to FIGS. 23 to 32, operation of processing the search result, performed by the search result processor 104, is explained according to an example embodiment of the present invention. In addition to obtaining the search result in various ways as described above, the information search apparatus 1 may analyze the search result being obtained and display the analysis result to the user. For the illustrative purpose, it is assumed that the search result processor 104 analyzes the search result using bibliographic data of the document.

Referring to FIG. 22, assuming that the document database 200 includes a collection of US published patent documents, each patent document includes various types of bibliographic data including, for example, the publication number, application number such as application serial number, classification number such as International Patent Classification (IPC) number, U.S. Classification (USC) number, or field of search, publication date, filing date, assignee name, attorney name, inventor name, related application data, priority data, etc.

FIG. 22 illustrates the example case in which the published patent document is the US published patent document. Alternatively, the bibliographic data may vary depending on the type of published patent document. For example, in the example case in which the published patent document is the Japanese published patent document, the classification number includes IPC number, FI, or F term.

In this example, after obtaining the search result from the search result obtainer 103, the search result processor 104 obtains bibliographic data that corresponds to one or more documents from the document database 200, and analyzes the search result using the obtained bibliographic data to generate an analysis result.

For example, the search result screen 500 of any one of FIGS. 12, 13, 18, 19, 20, and 21 may be switched to a search result screen 500 of FIG. 23 when the user selects the "BIOGRAPHIC DATA" option through the display format selection section 501. The search result screen 500 of FIG. 23 additionally includes an analysis selection section 503, which allows the user to select the method of analyzing the search result. For example, the method of analyzing the search result may be determined based on the type of biographic data that the user intends to use for analyzing the search result. The search result display section 502 displays an analysis result, which is generated based on the search result by analyzing using the analysis method input by the user through the analysis selection section 503.

More specifically, in one example, when the user selects the "BIOGRAPHIC DATA" option of the display format selection section 501 through the information input device 110 of the client apparatus 2, the client apparatus 2 additionally displays the analysis selection section 503, which allows the user to select the method of analysis, such as the type of bibliographic data for analysis. When the user selects the method of analysis through the information input device 110 of the client apparatus 2, the client apparatus 2 sends an instruction for analyzing the search result based on the selected method of analysis to the information search apparatus 1 through the network I/F 120 of the client apparatus 2. When the instruction for analyzing is received, the search result processor 104 analyzes the search result using the selected method of analysis to generate an analysis result, and sends the analysis result to the client apparatus 2 for display in the search result display section 502.

As illustrated in FIG. 23, when the user selects the "IPC" option through the analysis selection section 503, the search result processor 104 obtains one or more IPC numbers for each one of the documents included in the search result, and analyzes the search result based on the obtained IPC numbers to generate an analysis result.

Figure 24:
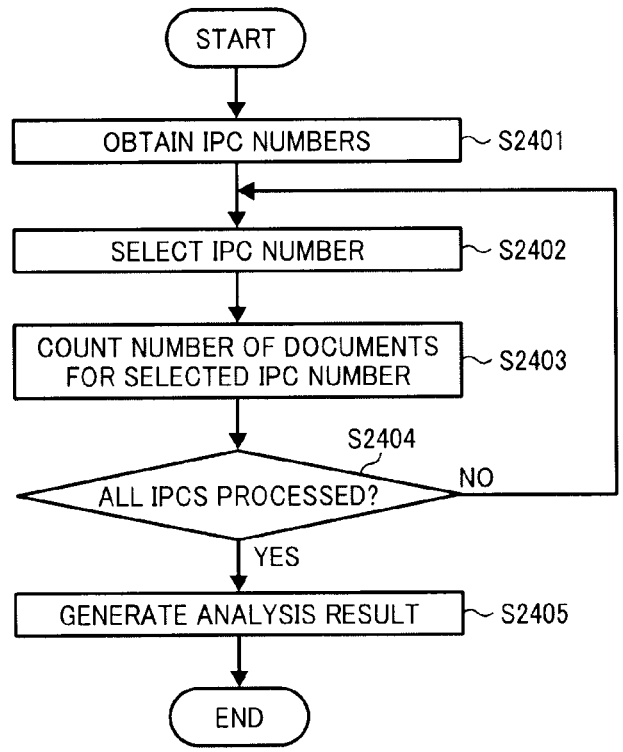
FIG. 24 is a flowchart illustrating operation of analyzing a search result, performed by the information search system of FIG. 1, according to an example embodiment of the present invention.

Referring to FIG. 24, operation of analyzing the search result based on the IPC number is explained according to an example embodiment of the present invention. The operation of FIG. 24 may be performed by the search result processor 104 when the instruction for analyzing the search result based on the IPC number is received.

Figure 25:
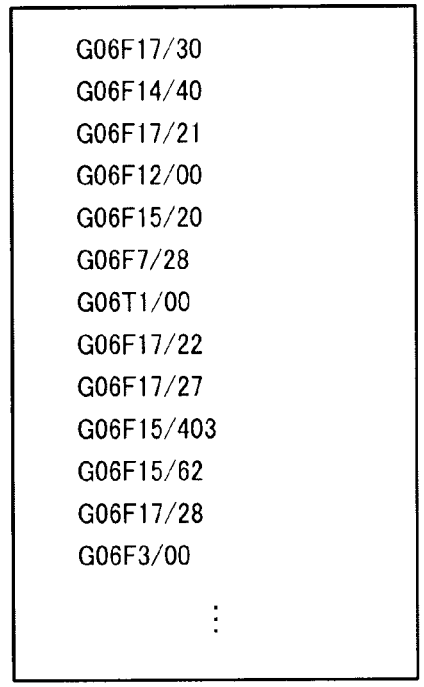
FIG. 25 is an illustration for explaining bibliographic data extracted from the search result.

At S2401, the search result processor 104 obtains one or more IPC numbers from each one of the documents obtained as the search result. The obtained IPC numbers may be stored in any desired memory, for example, in the form of table or list as illustrated in FIG. 25.

At S2402, the search result processor 104 selects one IPC number from the obtained IPC numbers as a selected IPC number.

At S2403, the search result processor 104 counts the number of documents obtained as the search result, which is assigned with the selected IPC number. The number of documents may be stored in any desired memory.

At S2404, the search result processor 104 determines whether all IPC numbers obtained at S2401 have been processed. When it is determined that all IPC numbers have been processed ("YES" at S2404), the operation proceeds to S2405. When it is determined that all IPC numbers have not been processed ("NO" at S2404), the operation returns to S2404 to select another IPC number to be processed.

At S2405, the search result processor 104 generates an analysis result to be displayed to the user based on the IPC number and the corresponding number of documents, which are each previously obtained, and the operation ends. The analysis result being generated by the search result processor 104 is further sent to the client apparatus 2 for display to the user.

Referring back to FIG. 23, the analysis result being displayed on the search result display section 502 indicates, for example, that the number of documents each assigned with the IPC number "G06F17/30" is 821, and the number of documents each assigned with the IPC number "G06F14/40" is 59. Further, in the example case illustrated in FIG. 23, the IPC number is listed in the order from the IPC number having the greatest corresponding number of documents to the IPC number having the smallest corresponding number of documents.

Further, in this example, one or more key terms may be displayed with respect to each one of the IPC number. In this example, each key term may be obtained by the search result processor 104 as a term that best describes a collection of documents assigned with the corresponding IPC number. For example, the document database 200 may store attribute information including one or more keywords for each document subjected for searching. In such case, the search result processor 104 may obtain, for each of the documents being assigned with the same IPC number, one or more keywords that corresponds to the document using the document number as a key. Once the keywords are obtained, the search result processor 104 may extract one or more keywords that are commonly used by a large number of documents assigned with the same IPC number, and use the extracted keywords as the key terms for display.

The operation described above referring to FIGS. 23 to 25 may be performed in various other ways, for example, depending on the method of analyzing the search result that has been selected by the user through the analysis selection section 503.

In alternative to the example case described above referring to FIGS. 23 to 25, the user may select the "IPC X 2" option as illustrated in FIG. 26 or the "IPC X 3" option as illustrated in FIG. 27 through the analysis selection section 503. When the "IPC X 2" option or the "IPC X 3" option is selected, the search result processor 104 obtains a combination of two or three IPC numbers for one or more documents included in the search result, and analyzes the search result based on the obtained combination of IPC numbers to generate an analysis result.

Alternatively, the search result screen 500 of FIG. 23 may be switched to a search result screen 500 of FIG. 26 when the user selects the "IPC X 2" option through the analysis selection section 503. Alternatively, the search result screen 500 may be switched to a search result screen 500 of FIG. 27 when the user selects the "IPC X 3" option through the analysis selection section 503. Further, in this example, any number of IPC number combinations may be used for analysis.

For example, when the user selects the "IPC X 2" option through the analysis selection section 503, the client apparatus 2 sends an instruction for analyzing the search result based on the combination of two IPC numbers to the information search apparatus 1 through the network I/F 120. When the instruction for analyzing is received, the search result processor 104 analyzes the search result based on the combination of two IPC numbers to generate an analysis result, and sends the analysis result to the client apparatus 2 for display in the search result display section 502.

Figure 28:
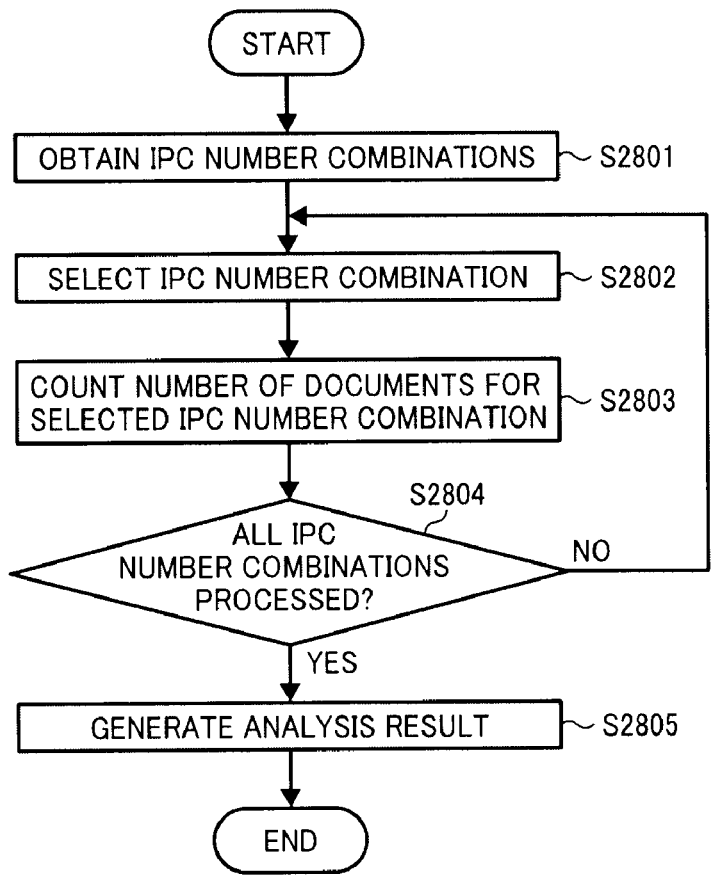
FIG. 28 is a flowchart illustrating operation of analyzing a search result, performed by the information search system of FIG. 1, according to an example embodiment of the present invention.

Referring to FIG. 28, operation of analyzing the search result based on a combination of IPC numbers is explained according to an example embodiment of the present invention. The operation of FIG. 28 may be performed by the search result processor 104 when the instruction for analyzing the search result based on the combination of IPC numbers is received.

Figure 29:
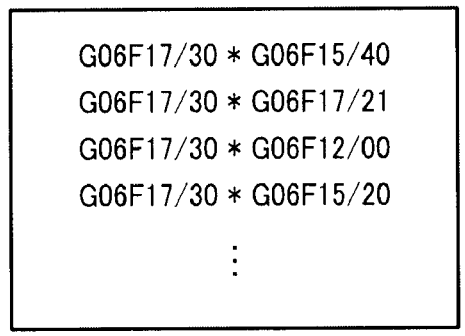
FIG. 29 is an illustration for explaining bibliographic data extracted from the search result.

At S2801, the search result processor 104 obtains a combination of any desired number of IPC numbers from one or more of the documents obtained as the search result. The obtained combination of IPC numbers may be stored in any desired memory, for example, in the form of table or list as illustrated in FIG. 29. FIG. 29 illustrates the example case in which the number of IPC numbers is two.

At S2802, the search result processor 104 selects one combination of IPC numbers from the obtained combinations of IPC numbers as a selected IPC number combination.

At S2803, the search result processor 104 counts the number of documents obtained as the search result, which is assigned with the selected IPC number combination. The number of documents may be stored in any desired memory.

At S2804, the search result processor 104 determines whether all IPC number combinations obtained at S2801 have been processed. When it is determined that all IPC number combinations have been processed ("YES" at S2804), the operation proceeds to S2805. When it is determined that all IPC number combinations have not been processed ("NO" at S2804), the operation returns to select another IPC number combination to be processed.

At S2805, the search result processor 104 generates an analysis result to be displayed to the user based on the IPC number combinations and the corresponding number of documents, which are each previously obtained, and the operation ends. The analysis result being generated by the search result processor 104 is further sent to the client apparatus 2 for display to the user.

Referring back to FIG. 26, the analysis result being displayed on the search result display section 502 indicates, for example, that the number of documents each assigned with a combination of IPC number "G06F17/30" and IPC number "G06F15/40" is 55, and the number of documents each assigned with a combination of IPC number "G06F17/30" and IPC number "G06F17/21" is 34.

Referring back to FIG. 27, the analysis result being displayed on the search result display section 502 indicates, for example, that the number of documents each assigned with a combination of IPC number "G06F17/30", IPC number "G06F15/40", and IPC number "G06T1/00" is 5, and the number of documents each assigned with a combination of IPC number "G06F17/30", IPC number "G06F17/21", and IPC number "G06F15/20" is 4.

As described above referring to any one of FIGS. 23 to 29, the information search apparatus 1 may generate an analysis result from the search result using the method of analysis selected by the user, and displays the analysis result to the user. Since the user is able to specify the type of bibliographic data to be used for analysis, the user may easily obtain the analysis result that satisfies the user's need. The search result screen 500 further allows the user to input a desired number of combinations to be used for classifying a plurality of bibliographic data items belonging to the specified bibliographic data type. This may help the user to have an idea regarding the general trend or characteristics of the documents being displayed as the search result.

The analysis result of any one of FIGS. 23, 26, and 27 is listed in the order from the IPC number having the greatest corresponding number of documents to the IPC number having the smallest corresponding number of documents. Alternatively, the analysis result may be listed in the order different from any one of FIGS. 23, 26, and 27.

For example, as illustrated in FIG. 30, the analysis result may be listed in the order from the IPC number having the smallest value to the IPC number having the largest value. By arranging the analysis result based on the value of the IPC number, the user may easily see the search result by its search field or technical field. In this example, the value of the IPC number may be determined based on a combination of alphabet and Arabic numeral.

In one example, the search result screen 500 of FIG. 23 may be switched to the search result screen 500 of FIG. 30 when the user inputs an instruction for sorting through the information input device 110 of the client apparatus 2. For example, the section in which the word "IPC" is displayed may function as a sort selection section that allows the user to sort the analysis result by the IPC number. When the instruction for sorting is input, the client apparatus 2 may send the instruction for sorting to the information search apparatus 1. When the instruction is received, the search result processor 104 may cause the analysis result to be displayed in the order determined by the IPC number.

Figure 31:
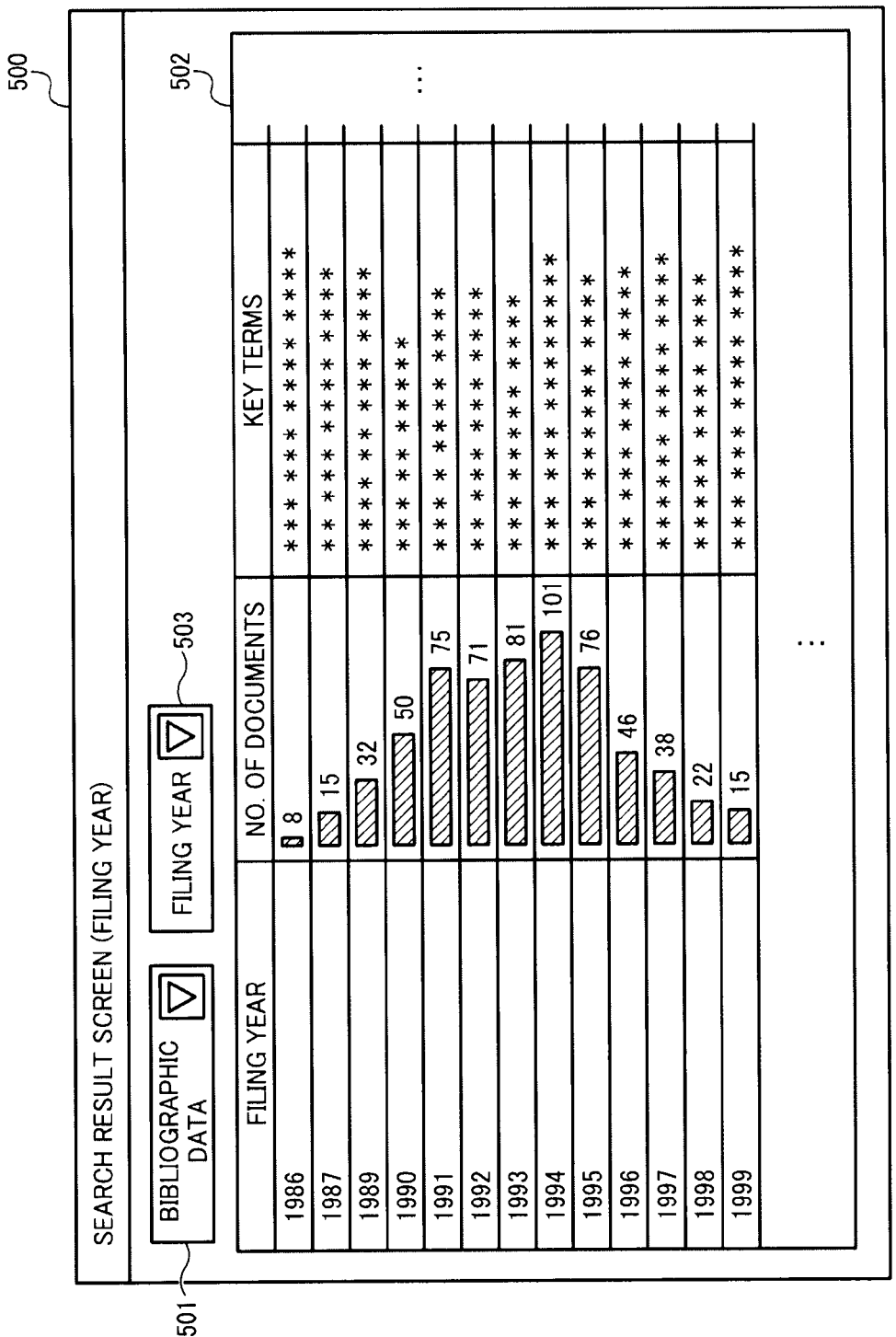
FIG. 31 is an illustration for explaining a search result screen, displayed by the client apparatus of FIG. 1, according to an example embodiment of the present invention.

In another example, as illustrated in FIG. 31, the user may select the "FILING YEAR" option through the analysis selection section 503. When the "FILING YEAR" option is selected, the search result processor 104 obtains the filing year for each of the documents obtained as the search result, and analyzes the search result based on the filing year to generate an analysis result. Referring to FIG. 31, the search result display section 502 lists the documents based on its filing year in the order from the document having the earliest filing year to the document having the latest filing year. By analyzing the search result based on the filing year, the user may be able to obtain information regarding the trend in the number of applications over time. Alternatively, the search result may be analyzed based on the month of filing or the date of filing. Alternatively, the search result may be analyzed based on the date, month, or year of publication.

Figure 32:
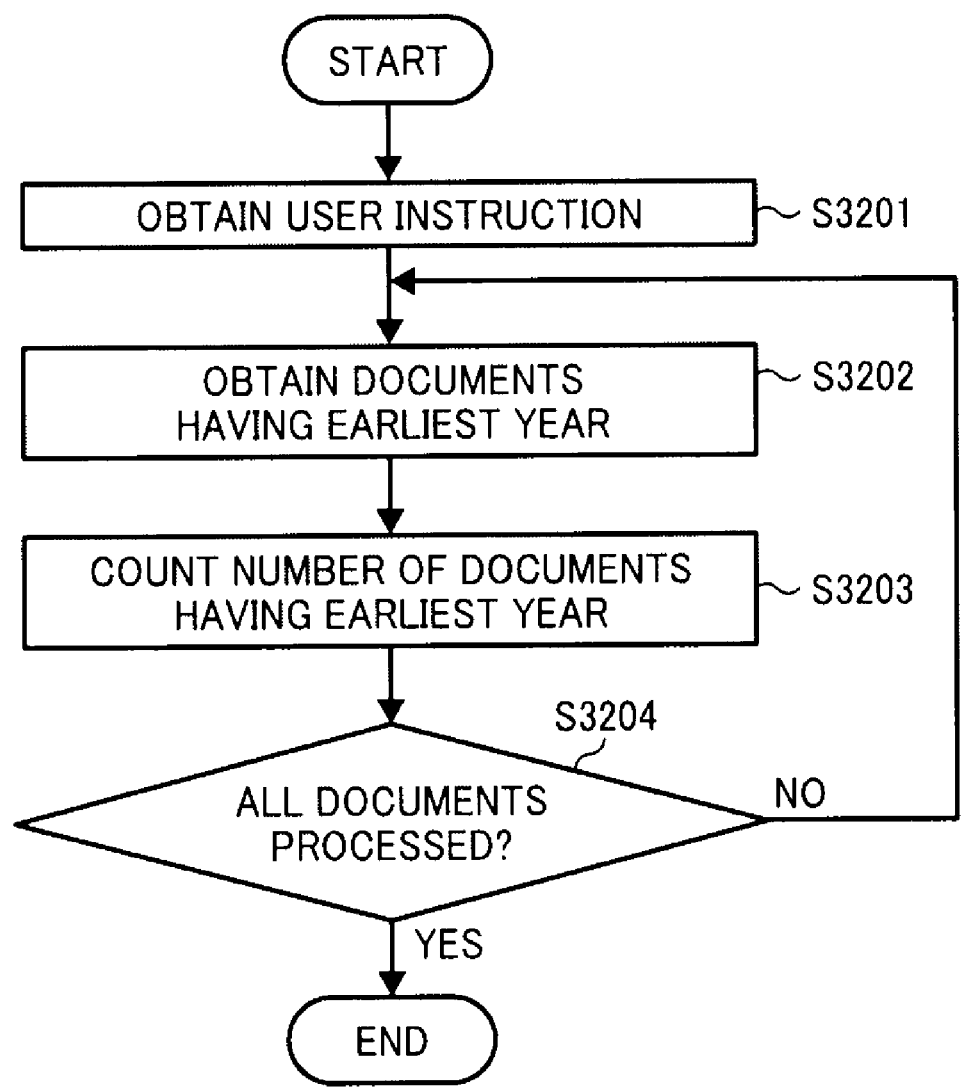
FIG. 32 is a flowchart illustrating operation of analyzing the search result, performed by the information search system of FIG. 1, according to an example embodiment of the present invention.

Referring to FIG. 32, operation of analyzing the search result based on the filing year, performed by the search result processor 104, is explained according to an example embodiment of the present invention.

At S3201, the search result processor 104 receives an instruction for analyzing the search result based on the filing year from the client apparatus 2.

At S3202, the search result processor 104 obtains one or more documents having the earliest filing year.

At S3203, the search result processor 104 counts a number of documents obtained at S3202, and generates information to be displayed to the user based on the counted number of documents. For example, as illustrated in FIG. 31, the search result processor 104 may generate a bar that indicates the counted number of documents for display to the user.

At S3204, the search result processor 104 determines whether all documents included in the search result have been processed. If it is determined that all document have been processed ("YES" at S3204), the operation ends. If it is determined that all document have not been processed ("NO" at S3204), the operation returns to S3202 to obtain one or more document having the earliest filing year from the unprocessed documents.

In alternative to the example case illustrated in FIG. 30 or 31, the user may select any other type of bibliographic data through the analysis selection section 503 according to the user preference. For example, as illustrated in FIG. 22, the search result may be analyzed based on the applicant, attorney, or inventor. In such case, the documents included in the search result may be listed in the order determined based on the name of applicant, attorney, or inventor, such as in the alphabetical order. Further, the documents included in the search result may be classified based on the combination of inventors in a substantially similar manner as the example case of analyzing the search result based on the combination of IPC numbers, which is described referring to FIG. 26 or 27.

As described above referring to FIG. 23 or 31, the search result may be arranged in any order, for example, according to the user preference that may be input through the information input device 110. Alternatively, the search result may be arranged in the order being determined based on the type of bibliographic data selected by the user through the analysis selection section 503.

In this example, when any one of IPC number, USC number, publication number, and application number are selected through the analysis selection section 503, the search result analyzer 104 arranges one or more groups of documents that are classified by the selected bibliographic data type in the order determined using information obtainable from the groups of documents. As described above referring to FIG. 23, when the IPC number is selected as the bibliographic data type, the search result analyzer 104 arranges the groups of documents in the order from the document group having the largest counted number of documents, to the document group having the smallest counted number of documents.

Further, in this example, when any one of publication date, filing date, assignee name, attorney name, and inventor name are selected through the analysis selection section 503, the search result analyzer 104 arranges one or more groups of documents that are classified by the selected bibliographic data type in the order determined using information obtainable from the selected bibliographic data. As described above referring to FIG. 31, when the filing year is selected as the bibliographic data type, the search result analyzer 104 arranges the groups of documents in the order from the document group having the earliest filing year, to the document group having the latest filing year.

For example, the information search apparatus 1 may store arrangement rule information specifying a rule to be used for determining the arrangement of the documents in any desired memory such as the RAM 20 or the HDD 40. In this example, the arrangement rule information includes first arrangement rule information indicating that, when the bibliographic data selected by the user corresponds to any one of publication date, filing date, assignee name, attorney name, and inventor name, the documents are to be arranged in the order determined based on information obtainable from the group of documents. The arrangement rule information further includes second arrangement rule information indicating that, when the bibliographic data selected by the user corresponds to any one of IPC number, USC number, publication number, and application number, the documents are to be arranged in the order determined based on information obtainable from the selected bibliographic data. Alternatively, the user may edit the arrangement rule information. Further, the arrangement rule information may be generated for each user. In such case, the arrangement rule information may be stored at the user site such as in the client apparatus 2. When the user selects the bibliographic data type, the analysis result is always displayed to the user in the order according to the user's preference.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, the examples described above assume that all devices of the search control device 100 are provided in the information search apparatus 1. Alternatively, any number of devices of the search control device 100 may be distributed over the network. For example, the search result processor 104 may be provided in the client apparatus 2. In such case, the information search apparatus 1 sends a search result to the client apparatus 2. The search result may include, for example, document information identifying a document that matches a search option input by a user, search term information regarding a search term determined based on the search option, and relevancy information indicating the degree of relevancy between the document and the search term. The search result may be sent in any desired format such as in the form of table illustrated in FIG. 9 or in the form of search matrix illustrated in FIG. 11. When the search result is obtained, the client apparatus 2 generates search result information based on the search result, for example, by organizing the search result into the form of list, table, or matrix. The client apparatus 2 may display the search result information to the user as the search result screen 500. Further, the client apparatus 2 may process the search result according to a user instruction to generate an analysis result, and display the analysis result to the user.

In another example, an information search apparatus may include: an interface to obtain a search option input by a user; a processor; and a storage device to store a plurality of instructions which causes the processor to perform search when the search option is obtained through the interface. The processor is caused to obtain a search term extracted from the search option as an extracted search term and to obtain a related search term corresponding to the extracted search term; generate correspondence relationship information indicating the correspondence relationship between the extracted search term and the related search term; and cause a display device to display the extracted search term and the related search term in a format indicating the correspondence relationship between the extracted search term and the related search term using the correspondence relationship information.

In the above-described example, the processor may cause the display device to display a graphical image representing the correspondence relationship. The graphical image may be generated in any shape, mark, pattern, etc. as long as the correspondence relationship is indicated.

Alternatively, in order to indicate the correspondence relationship, the processor may cause the display device to display the extracted search term and the corresponding related search term in the same appearance, such as in the same color or the same font.

In the above-described example, the processor may generate extracted search term identification information identifying the extracted search term and related search term identification information identifying the related search term; and cause the display device to display the extracted search term and the related search term in a format different from each other using the extracted search term identification information and the related search term identification information.

In the above-described example, when the extracted search term includes a plurality of extracted search terms, the processor may generate search term identification information identifying each of the plurality of extracted search terms, and cause the display device to display the plurality of extracted search terms differently from one another. For example, the processor may determine the color based on the search term identification information.

In the above-described example, the processor may cause the display device to display a selection section corresponding to the related search term. The selection section may be activated by a user input, and cause information regarding selection of the related search term to be sent to the processor. The processor may further determine whether to use the related search term being displayed for searching based on the information regarding selection of the related search term. Alternatively or additionally, the processor may cause the display device to display a selection section corresponding to the extracted search term.

In the above-described example, the processor may further search a document database to obtain a first document that matches the extracted search term and a second document that matches the related search term; generate a first search result including first document information identifying the first document and a second search result including second document information identifying the second document; and cause the display device to display the first search result and the second search result in a format indicating the correspondence relationship of the first document information, the extracted search term, the second document information, and the related search term.

In another example, an information search system may include an information processing apparatus to send a search option input by a user; and an information search apparatus coupled to the information processing apparatus via a network. The information search apparatus may obtain a search term extracted from the search option as an extracted search term and to obtain a related search term corresponding to the extracted search term; generate correspondence relationship information indicating the correspondence relationship between the extracted search term and the related search term; send the correspondence relationship information to the information processing apparatus. The information processing apparatus may further display the extracted search term and the related search term in a format indicating the correspondence relationship between the extracted search term and the related search term using the correspondence relationship information.

In the above-described example, the information processing apparatus may further display a graphical image representing the correspondence relationship. The graphical image may be generated in any shape, mark, pattern, etc. as long as the correspondence relationship is indicated.

In the above-described example, the information search apparatus may further generate extracted search term identification information identifying the extracted search term and related search term identification information identifying the related search term; and send the extracted search term identification information and the related search term identification information. The information processing apparatus may further display the extracted search term and the related search term in a format different from each other using the extracted search term identification information and the related search term identification information.

In the above-described example, the information processing apparatus may further display a selection section corresponding to the related search term; and send information regarding selection of the related search term to the information search apparatus when the selection section is selected by the user. The information search apparatus may determine whether to use the related search term being displayed for searching based on the information regarding selection of the related search term received from the information processing apparatus.

In the above-described example, the information search apparatus may further search a document database to obtain a first document that matches the extracted search term and a second document that matches the related search term; and send a first search result including first document information identifying the first document and a second search result including second document information identifying the second document. The information processing apparatus may further display the first search result and the second search result in a format indicating the correspondence relationship of the first document information, the extracted search term, the second document information, and the related search term.

In another example, an information search method may be performed according to the information search program, which includes: obtaining a search option input by a user through a user interface; obtaining a search term extracted from the search option as an extracted search term and to obtain a related search term corresponding to the extracted search term; generating correspondence relationship information indicating the correspondence relationship between the extracted search term and the related search term; and displaying through a display device the extracted search term and the related search term in a format indicating the correspondence relationship between the extracted search term and the related search term using the correspondence relationship information.

In another example, an information search apparatus includes: an interface to obtain a user instruction for analyzing a search result including information regarding a plurality of documents previously obtained in response to a search request sent by a user, the user instruction for analyzing including information specifying a type of attribute data to be used for analyzing the search result, the attribute data being previously assigned for each document as information indicating characteristics of each document; a processor; and a storage device to store a plurality of instructions which causes the processor to perform analysis based on the search result when the user instruction for analyzing is obtained through the interface. The processor may further classify the plurality of documents included in the search result based on the specified attribute data type into one or more groups of the plurality of documents; determine an arrangement of the one or more groups of the plurality of documents according to the specified attribute data type; and cause a display device to display an analysis result including information regarding the one or more groups of the plurality of documents in the determined arrangement.

In the above-described example, the information search apparatus may further include a storage device to store arrangement rule information specifying a rule to be used for determining the arrangement of the one or more groups of the plurality of documents according to the specified attribute data type. The arrangement rule information includes: first arrangement rule information indicating that, when the specified attribute data type belongs to a first data type, the one or more groups of the plurality of documents are to be arranged in the order determined based on the specified attribute data type; and second arrangement rule information indicating that, when the specified attribute data type belongs to a second data type, the one or more groups of the plurality of documents are to be arranged in the order determined based on information regarding the one or more groups of the plurality of documents.

In the above-described example, when the user instruction for analyzing further includes information specifying a combination number to be used for analyzing the search result, the combination number specifying a number of combinations to be used for classifying a plurality of attribute data items belonging to the specified attribute data type, the processor may further: classify a plurality of attribute data items obtainable from the plurality of documents based on the specified combination number into one or more groups of the plurality of attribute data items; classify the plurality of documents based on the one or more groups of the plurality of attribute data items into one or more groups of the plurality of documents; and cause the display device to display an analysis result including information regarding the one or more groups of the plurality of documents, wherein the search result including, for each one of the one or more groups of the plurality of attribute data items, information identifying a group of the plurality of attribute data items and information regarding the corresponding one of one or more groups of the plurality of documents.

In another example, an information search system includes: an information search apparatus and an information processing apparatus connected through a network. The information processing apparatus may send a user instruction for analyzing a search result to the information search apparatus, the search result including information regarding a plurality of documents previously obtained in response to a search request sent by a user. The user instruction for analyzing including information specifying a type of attribute data to be used for analyzing the search result, the attribute data being previously assigned for each document as information indicating characteristics of each document. When the user instruction is received, the information search apparatus may further classify the plurality of documents included in the search result based on the specified attribute data type into one or more groups of the plurality of documents; determine an arrangement of the one or more groups of the plurality of documents according to the specified attribute data type; and cause the information processing apparatus to display an analysis result including information regarding the one or more groups of the plurality of documents in the determined arrangement.

In another example, an information search method includes: obtaining a user instruction for analyzing a search result including information regarding a plurality of documents previously obtained in response to a search request sent by a user, the user instruction for analyzing including information specifying a type of attribute data to be used for analyzing the search result, the attribute data being previously assigned for each document as information indicating characteristics of each document; classifying the plurality of documents included in the search result based on the specified attribute data type into one or more groups of the plurality of documents; determine an arrangement of the one or more groups of the plurality of documents according to the specified attribute data type; and causing a display device to display an analysis result including information regarding the one or more groups of the plurality of documents in the determined arrangement.

In another example, an information search apparatus may be provided, which includes an interface to obtain a search option input by a user, a processor, and a storage device to store a plurality of instructions which causes the processor to perform search when the search option is obtained through the interface. The processor may determine a search term based on the search option; search a document database to obtain a document that matches the search term; generate a search result including document information identifying the document that matches the search term, search term information identifying the search term, and correspondence relationship information indicating the correspondence relationship between the search term and the document; and cause a display device to display the search result in a format indicating the correspondence relationship of the document information and the search term using the correspondence relationship information.

In the above-described example, the correspondence relationship information may include relevancy information indicating the degree of relevancy between the search term and the document.

In the above-described example, the correspondence relationship information may include search result correspondence relationship information indicating the correspondence relationship of at least two of the document information, the search term, and the relevancy information.

In another example, an information search system may be provided, which includes an information search apparatus and an information processing apparatus connected through a network. The information processing apparatus may send a search option input by a user to the information search apparatus. The information search apparatus may determine a search term based on the search option; searching a document database to obtain a document that matches the search term; generate a search result including document information identifying the document that matches the search term, search term information identifying the search term, and correspondence relationship information indicating the correspondence relationship between the search term and the document; and cause the information processing apparatus to display the search result in a format indicating the correspondence relationship of the document information and the search term using the correspondence relationship information.

In another example, an information search method may be provided, which includes: obtaining a search option input by a user; determining a search term based on the search option; searching a document database to obtain a document that matches the search term; generating a search result including document information identifying the document that matches the search term, search term information identifying the search term, and correspondence relationship information indicating the correspondence relationship between the search term and the document; and causing a display device to display the search result in a format indicating the correspondence relationship of the document information and the search term using the correspondence relationship information.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An information search apparatus, comprising:
   an interface configured to obtain a search option input by a user;
   a processor; and
   a storage device configured to store a plurality of instructions which causes the processor to perform searching when the search option is obtained through the interface,
   wherein the processor is further configured to:
   determine a search term based on the search option, the search term including an extracted search term that is extracted from the search option;
   search a document database to obtain a document that matches the search term;
   generate a search result including document information identifying the document that matches the search term and relevancy information indicating a degree of relevancy between the search term and the document;
   cause a display device to display the search result in a format indicating the correspondence relationship of the document information, the search term, and the relevancy information,
   wherein the format indicating the correspondence relationship is a matrix, the matrix including a cell that represents relevancy information between the search term and the document, the matrix is displayed on the display device, and the cell, which is linked to the document, is configured to be activated by a user input and to cause the display device to display at least a portion of the document having the search term with the search term displayed in the document differently from other words in the document,
   wherein the matrix includes
      a row including a matrix element representing one of the search term or the document information,
      a column including a matrix element representing another one of the search term or the document information, and
      the cell being provided at a location where the matrix element representing the search term and the matrix element representing the document information meet and indicating the degree of relevancy between the search term represented by the corresponding matrix element and the document identified by the document information represented by the corresponding matrix element, and
   wherein, when the search term includes a plurality of search terms, the processor is further configured to generate a plurality of search results for each one of the plurality of search terms, and cause the display device to display the plurality of search results in the format indicating the correspondence relationship of the document information, the search term, and the relevancy information for each one of the plurality of search results; and
   the relevancy information is displayed visually in a graphical image having a shape representing the relevancy information.

2. The apparatus of claim 1, wherein, when the document that matches the search term includes a plurality of documents, the processor is further configured to:
   generate, for each one of the plurality of documents, search result correspondence relationship information indicating the correspondence relationship of at least two of the document information, the search term, and the relevancy information,
   wherein the cell representing the relevancy information includes the search result correspondence relationship information.

3. The apparatus of claim 1, further comprising:
   a storage device configured to store the plurality of search terms, wherein:
   the processor is further configured to generate, for each one of the plurality of search terms, search term identification information for identifying each search term and to store the search term identification information that corresponds to each one of the plurality of search terms in the storage device.

4. The apparatus of claim 3, wherein, when the plurality of search terms further includes a related search term corresponding to the extracted search term, and the processor is further configured to:
   generate correspondence relationship information indicating the correspondence relationship between the extracted search term and the related search term; and
   cause the display device to display the extracted search term and the related search term in a format indicating the correspondence relationship between the extracted search term and the related search term using the correspondence relationship information.

5. The apparatus of claim 1, wherein the processor is further configured to determine an arrangement of a plurality of matrix elements included in the matrix based on the relevancy information.

6. The information search apparatus of claim 1, wherein the search result is caused to be displayed for the extracted search term and a related search term corresponding to the extracted search term, wherein the related search term is acquired from a dictionary database, and the extracted search term and the related search term are caused to be displayed in format indicating a correspondence relationship between the extracted search term and the related search term.

7. The information search apparatus of claim 1, wherein the graphical image represents the relevancy information by circular shape.

8. An information search system, comprising:
   an information processing apparatus configured to send a search option input by a user; and
   an information search apparatus coupled to the information processing apparatus via a network and configured to:
   determine a search term based on the search option received from the information processing apparatus, the search term including an extracted search term that is extracted from the search option;
   search a document database to obtain a document that matches the search term;
   send a search result to the information processing apparatus, the search result including document information identifying the document that matches the search term and relevancy information indicating a degree of relevancy between the search term and the document, wherein the information processing apparatus is further configured to display the search result in a format indicating the correspondence relationship of the document information, the search term, and the relevancy information, wherein the format indicating the correspondence relationship is a matrix, the matrix including a cell that represents relevancy information between the search term and the document, the matrix is displayed on a display device, and the cell, which is linked to the document, is configured to be activated by a user input and to cause the information processing apparatus to display at least a portion of the document having the search term with the search term displayed in the document differently from the other words in the document, wherein the matrix includes
- a row including a matrix element representing one of the search term or the document information,
- a column including a matrix element representing another one of the search term or the document information, and
- the cell being provided at a location where the matrix element representing the search term and the matrix element representing the document information meet and indicating the degree of relevancy between the search term represented by the corresponding matrix element and the document identified by the document information represented by the corresponding matrix element, and wherein, when the search term includes a plurality of search terms, the information search apparatus is further configured to generate a plurality of search results for each one of the plurality of search terms, and the information processing apparatus is configured to display the plurality of search results in the format indicating the correspondence relationship of the document information, the search term, and the relevancy information for each one of the plurality of search results; and the relevancy information is displayed visually in a graphical image having a shape representing the relevancy information.

9. The system of claim 8, wherein the information processing apparatus is further configured to:
- display a document display section in the cell representing the relevancy information;
- obtain at least a portion of the corresponding document having the corresponding search term when the document display section is activated by a user input; and
- display the obtained portion of the corresponding document having the corresponding search term.

10. The system of claim 8, wherein, when the document that matches the search term includes a plurality of documents, the information search apparatus is further configured to:
- generate, for each one of the plurality of documents, search result correspondence relationship information indicating the correspondence relationship of at least two of the document information, the search term, and the relevancy information,
- wherein the cell representing the relevancy information includes the search result correspondence relationship information.

11. The system of claim 8, wherein the information processing apparatus is further configured to determine an arrangement of a plurality of matrix elements included in the matrix based on the relevancy information.

12. The system of claim 8, further comprising:
- a storage device configured to store the plurality of search terms, wherein:
- the information search apparatus is further configured to generate, for each one of the plurality of search terms, search term identification information for identifying each search term and to store the search term identification information that corresponds to each one of the plurality of search terms in the storage device.

13. The system of claim 12 wherein, when the plurality of search terms further includes a related search term corresponding to the extracted search term, the information search apparatus is further configured to:
- generate correspondence relationship information indicating the correspondence relationship between the extracted search term and the related search term and to send the correspondence relationship information to the information processing apparatus,
- wherein the information processing apparatus is further configured to display the extracted search term and the related search term in a format indicating the correspondence relationship between the extracted search term and the related search term using the correspondence relationship information.

14. The information search system of claim 8, wherein the search result is caused to be displayed for the extracted search term and a related search term corresponding to the extracted search term, wherein the related search term is acquired from a dictionary database, and the extracted search term and the related search term are caused to be displayed in format indicating a correspondence relationship between the extracted search term and the related search term.

15. The information search system of claim 8, wherein the graphical image represents the relevancy information by circular shape.

16. An information search method, comprising:
- obtaining a search option input by a user through a user interface;
- determining a search term based on the search option, the search term including an extracted search term that is extracted from the search option;
- searching a document database to obtain a document that matches the search term;
- generating a search result including document information identifying the document that matches the search term and relevancy information indicating a degree of relevancy between the search term and the document;
- displaying through a display device the search result in a format indicating the correspondence relationship of the document information, the search term, and the relevancy information, wherein the format indicating the correspondence relationship is a matrix, the matrix including a cell that represents relevancy information between the search term and the document, the matrix is displayed on the display device, and the cell, which is linked to the document, is configured to be activated by a user input and to cause the display device to display at least a portion of the document having the search term, wherein the matrix includes
- a row including a matrix element representing one of the search term or the document information,
- a column including a matrix element representing another one of the search term or the document information, and
- the cell being provided at a location where the matrix element representing the search term and the matrix element representing the document information meet and indicating the degree of relevancy between the search term represented by the corresponding matrix element and the document identified by the document information represented by the corresponding matrix element; and wherein the search term includes a plurality of search terms, generating a plurality of search results for each one of the plurality of search terms, causing the display device to display the plurality of search results in the format indicating the correspondence relationship of the document information, the search term, and the relevancy information for each one of the plurality of search results; and the relevancy information is displayed visually in a graphical image having a shape representing the relevancy information.

17. The method of claim 16, wherein the graphical image represents the relevancy information by circular shape.

* * * * *